(12) United States Patent
Fuse

(10) Patent No.: US 6,754,448 B2
(45) Date of Patent: Jun. 22, 2004

(54) MULTIPLEX TRANSMISSION APPARATUS

(75) Inventor: Masaru Fuse, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 569 days.

(21) Appl. No.: 09/891,473

(22) Filed: Jun. 27, 2001

(65) Prior Publication Data

US 2002/0001113 A1 Jan. 3, 2002

(30) Foreign Application Priority Data

Jun. 28, 2000 (JP) ........................................ 2000-195070

(51) Int. Cl.[7] .............................................. H04J 14/00
(52) U.S. Cl. ............................ 398/43; 398/79; 398/75; 398/76; 398/82; 398/91; 398/98; 398/102; 398/140; 398/141; 398/161; 398/163; 398/182; 398/183
(58) Field of Search ............................ 398/75, 76, 79, 398/82, 91, 98, 102, 43, 140, 141, 161, 163, 182, 183

(56) References Cited

U.S. PATENT DOCUMENTS 5,339,183 A * 8/1994 Suzuki ........................ 398/75
5,691,832 A * 11/1997 Liedenbaum et al. ......... 398/43

* cited by examiner

Primary Examiner—Hanh Phan
(74) Attorney, Agent, or Firm—Wenderoth, Lind & Ponack, L.L.P.

(57) ABSTRACT

An multiplex transmission apparatus that realizes a receiving system using a phased array antenna with high efficiency and low cost is provided. A delay controller 102 gives a time delay to a local oscillation signal outputted from a signal source 101. First and second optical transmitters 1031 and 1032 each converts the local oscillation signal and the delayed local oscillation signal into optical signals. A first optical multiplexer 104 multiplexes the optical signals for transmission. An optical separator 106 separates the multiplexed optical signal. A first multiplexer 1071 multiplexes first and second main element signals, while a second multiplexer 1072 multiplexes first and second sub-element signals. First and second optical modulators 1081 and 1082 each modulates the optical signal with multiplexed electrical signal group. A second optical multiplexer 109 multiplexes the modulated optical signals for transmission. An optical receiver 110 carries out square-low detection on the multiplexed optical signal. Then, from the optical receiver 110, the first or second main element (or sub-element) signal is obtained with its frequency converted.

33 Claims, 16 Drawing Sheets

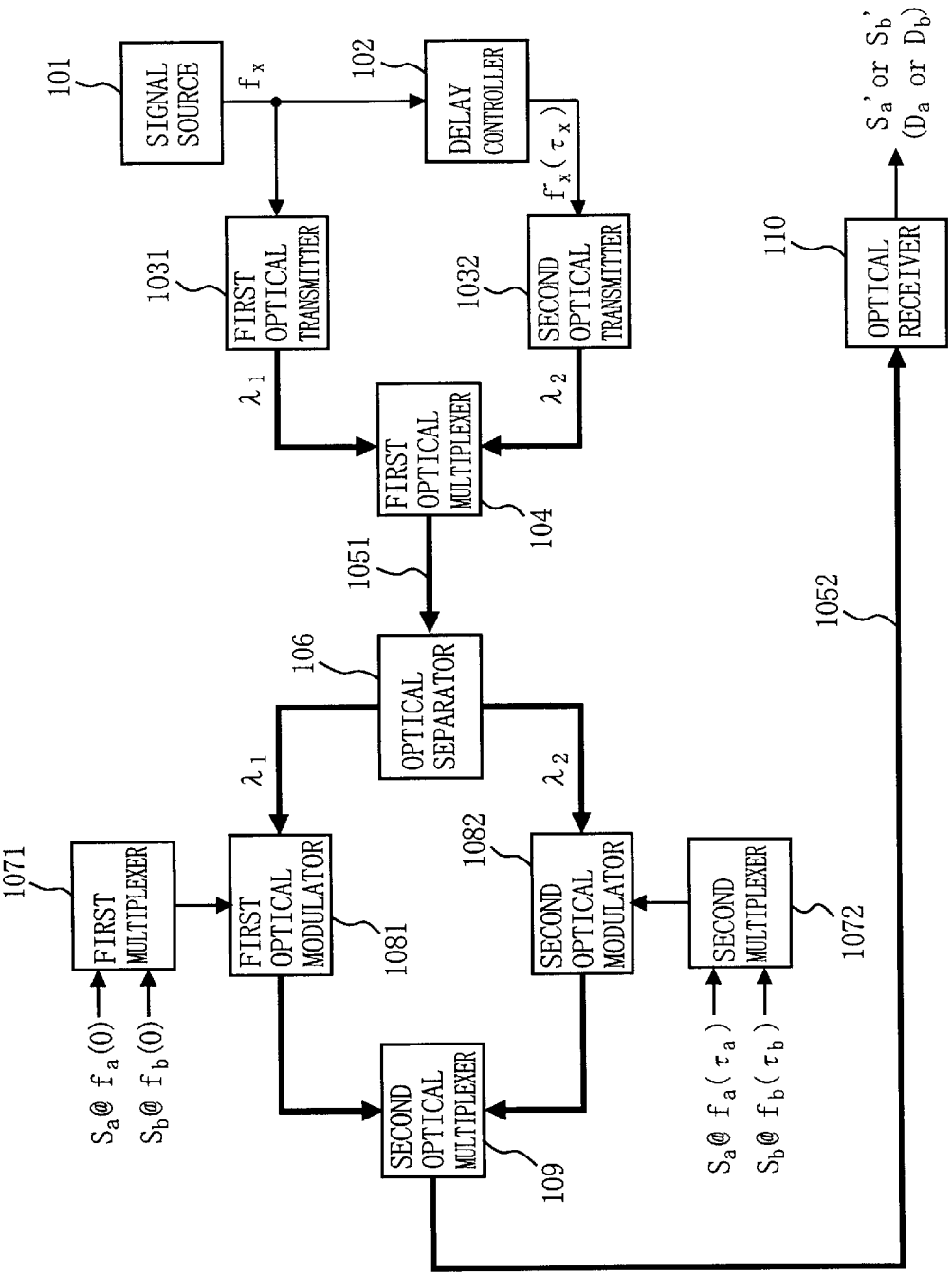

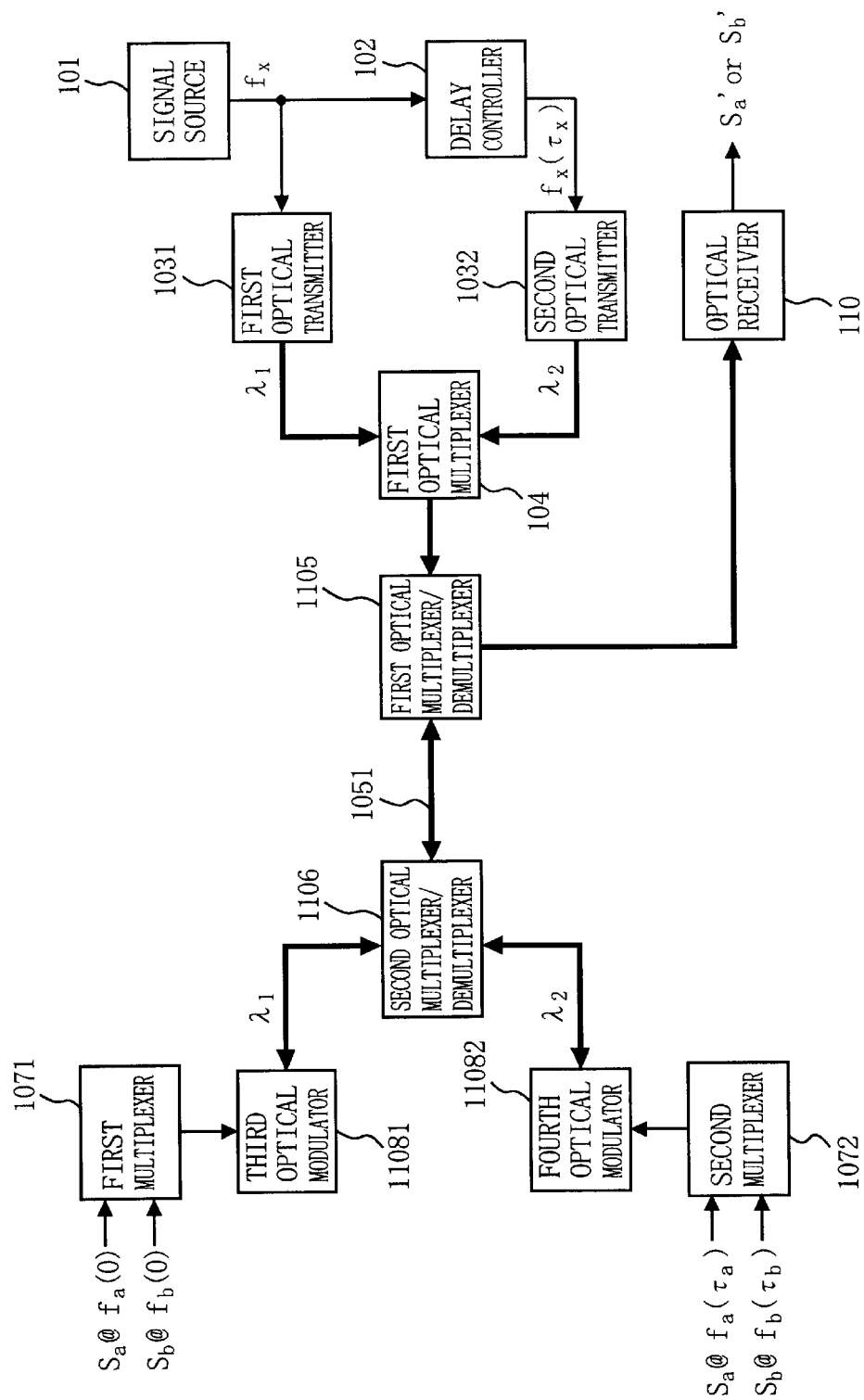

MULTIPLEX TRANSMISSION APPARATUS

BACKGROUND OF THE INVENTION

1. Field of the Invention

The present invention relates to multiplex transmission apparatuses for optically transmitting a plurality of signals and, more specifically, to a multiplex transmission apparatus that converts a plurality of the same or similar signals varied in phase into optical signals and multiplexes these signals for transmission through a single optical fiber.

2. Description of the Background Art

FIG. 15 is a block diagram showing the structure of a conventional multiplex transmission apparatus. In FIG. 15, the multiplex transmission apparatus includes first and second multiplexers 15011 and 15012, first and second optical transmitters 15021 and 15022, an optical multiplexer 1503, an optical transmission path 1504, an optical separator 1505, first and second optical receivers 15061 and 15062, a delay controller 1507, and a multiplexer 1508.

The operation of the above structured multiplex transmission apparatus is described. The first and second multiplexers 15011 and 15012 each multiplex a plurality of electrical signals externally supplied (for example, RF signals received by an antenna), and then outputs the resultant signal.

Assume herein that the electrical signals supplied to the first and second multiplexers 15011 and 15012 are equal in signal parameter such as frequency, modulation scheme and modulation information, but different in phase. One example of such signals are those outputted from the same signal source but having different phases because they respectively reached the first and second multiplexers 15011 and 15012 at different times.

In FIG. 15, the first and second multiplexers 15011 and 15012 are each supplied with two electrical signals. The first multiplexer 15011 is supplied with a first signal (hereinafter, first main element signal) Sa having a frequency fa and a phase angle 0 and a second signal (hereinafter, second main element signal) Sb having a frequency fb and a phase angle 0. The second multiplexer 15012 is supplied with a first signal (hereinafter, first sub-element signal) Sa having the frequency fa and a phase angle+τ1 (phase delayed by τ1) and a second signal (hereinafter, second sub-element signal) Sb having the frequency fb and a phase angle−τ2 (representing phase advanced by τ2). Note that the first main element signal and the first sub-element signal are hereinafter collectively referred to as first element signals, while the second main element signal and the second sub-element signal are as second element signals.

In FIG. 15, the above signals are represented as follows: the first main element signal as Sa@fa(0), the second main element signal as Sb@fb(0), the first sub-element signal as Sa@fa(τa), and the second sub-element signal as Sb@fb(τb). The mark "@" is an identification mark with a signal name placed therebefore and signal parameters placed thereafter for indicating attributes. Placed as the signal parameters are the frequency and the phase angle, which is enclosed in parentheses.

Note that the above phase angles can be converted into propagation delay times, and therefore are treated herein as equivalent thereto. Also, the first and second main element signals are hereinafter collectively referred to as a main signal group, while the first and second sub-element signals are as a sub-signal group.

The first optical transmitter 15021, provided correspondingly to the first multiplexer 15011, converts the main signal group outputted from the first multiplexer 15011 into a first optical signal having a wavelength λ1. Similarly, the second optical transmitter 15022, provided correspondingly to the second multiplexer 15012, converts the sub-signal group outputted from the second multiplexer 15012 into a second optical signal having a wavelength λ2.

The optical multiplexer 1503 multiplexes the optical signals outputted from the first and second optical transmitters 15021 and 15022, and sends out the resultant optical signal to the optical transmission path 1504. The optical separator 1505 separates the optical signal coming through the optical transmission path 1504 into two, based on the wavelength. The separated optical signals are outputted as a first optical signal having the wavelength λ1 and a second optical signal having the wavelength λ2.

The first optical receiver 15061 is supplied with the first optical signal outputted from the optical separator 1505. The first optical receiver 15061 converts the supplied first optical signal into an electrical signal (main signal group) through square-law detection. Similarly, the second optical receiver 15062 is supplied with the second optical signal outputted from the optical separator 1505. The second optical receiver 15062 converts the supplied second optical signal into an electrical signal (sub-signal group) through square-law detection.

The delay controller 1507 gives a predetermined time delay τx to the main signal group outputted from the first optical receiver 15061, and then outputs the main signal group. The multiplexer 1508 multiplexes the main signal group with the time delay given thereto outputted from the delay controller 1507 and the sub-signal group outputted from the second optical receiver 15062, and then outputs the resultant signal.

For the above structured multiplex transmission apparatus, how to set the time delay τx in the delay controller 1507, and the operational principle and effects of the apparatus in terms of setting the time delay are described below by using an example.

FIG. 16 is one example of application of the present apparatus, schematically illustrating the structure of a receiving system using a phased array antenna. In FIG. 16, the system includes first and second antenna elements 16011 and 16012, first and second transmission paths 16041 and 16042, a delay controller 1507, and a multiplexer 1508.

Here, the first and second antenna elements 16011 and 16012 in FIG. 16 correspond to the first and second multiplexers 15011 and 15012 in FIG. 15, respectively. Also, the first and second transmission paths 16041 and 16042 in FIG. 16 schematically correspond to a propagation path from the first optical transmitter 15021 to the first optical receiver 15061 and a propagation path from the second optical transmitter 15022 to the second optical receiver 15062, respectively. The delay controller 1507 and the multiplexer 1508 in FIGS. 15 and 16 are the same in structure, and therefore provided with the same reference numerals.

The first antenna element 16011 in FIG. 16 is supplied with signals similar to the first main element signal and the second main element signal supplied to the first multiplexer 15011 in FIG. 15. The second antenna element 16012 in FIG. 16 is supplied with signals similar to the second main element signal and the second sub-element signal supplied to the second multiplexer 15012 in FIG. 15. In other words, the first main element signal and the first sub-element signal are the same signal outputted from the same signal source, but different in phase due to a positional relation among the signal source and the first and second antenna elements 16011 and 16012. The same goes for the second main element signal and the second sub-element signal.

For example, the first main element signal supplied to the first antenna element 16011 is the first element signal Sa, and so is the first sub-element signal supplied to the second antenna element 16012. However, the first sub-element signal passes through a propagation path longer than that of the first main element signal, and therefore is delayed in phase by the amount corresponding to the propagation time difference+τa.

On the other hand, the second main element signal supplied to the first antenna element 16012 is the second element signal Sb, and so is the second sub-element signal supplied to the second antenna element 16012. However, the second sub-element signal passes through a propagation path shorter than that of the second main element signal, and therefore is advanced in phase by the amount corresponding to the propagation time difference−τb.

The element signals supplied to the first and second antenna elements 16011 and 16012 are multiplexed together, propagated through the corresponding first and second transmission paths 16021 and 16022, and then multiplexed by the multiplexer 1508.

Here, according to principles governing this receiving system, in a case where two signals equal in signal parameter such as frequency, modulation scheme, and modulation information are multiplexed together, the resultant signal has an amplitude double the amplitude of these signals if they are equal in phase. On the other hand, if these two signals are different in phase, both signals are cancelled out, and the signal level after multiplexing becomes lower or none.

Since the system shown in FIG. 16 (or the apparatus shown in FIG. 15) follows the above principles, the delay controller 1507 is inserted into the first transmission path 1604, giving the time delay τx. By adjusting the time delay τx, the system can selectively output the first or second element signal from the multiplexer 1508.

For example, the time delay τx is so adjusted as to coincide with the propagation time difference+τa of the first sub-element signal supplied to the second multiplexer 15012 (or the second antenna element 16012) with reference to the first main element signal supplied to the first multiplexer 15011 (or the first antenna element 16011). Thus, the system can selectively output the first element signal. Alternatively, the time delay τx is so adjusted as to coincide with the propagation time difference−τb of the second sub-element signal supplied to the second multiplexer 15012 (or the second antenna element 16012) with reference to the second main element signal supplied to the first multiplexer 15011 (or the first antenna element 16011). Thus, the system can selectively output the second element signal.

Note that the number of multiplexers (or antenna elements) is not restricted to two, and may be more, as required. In such case, the transmission path and the delay controller are required as many as the multiplexers or the antenna elements.

As stated above, in the conventional multiplex transmission apparatus, signal groups including a plurality of element signals varied in phase are transmitted through a plurality of paths corresponding to the signal groups, and then multiplexed together for output. In such structure, the propagation time of each path is appropriately controlled and adjusted, thereby enabling selective extraction of only the element signal having a predetermined phase difference.

More specifically, when applied to a receiving system for a phased array antenna, the conventional apparatus can easily control radio-wave receive angle (directivity) of the antenna.

However, the conventional multiplex transmission apparatus is not cost-effective due to its structure. More specifically, as stated above, the conventional apparatus is so structured as to convert signal groups each including a plurality of element signals varied in phase into optical signals, branch them, convert them again to electrical signals, adjust each delay time thereof, and then multiplex them together. For such structure, an optical receiver for optical-electrical conversion is required for each optical signal. This increases costs required for constructing the apparatus. Also, if the apparatus is applied to a receiving system using a phased array antenna, a plurality of light sources have to be placed on the antenna side. This increases costs required for constructing the antenna, and badly impairs the cost effectiveness of the system.

Moreover, in the above structure, only one element signal can be selectively extracted. Therefore, in the receiving system using the phased array antenna, the radio-wave receive angle can be swept in time by varying the delay time in the delay controller. Momentarily, however, the receiving direction is restricted to one. Therefore, the use efficiency of the antenna and the transmission efficiency of the optical transmission path are both decreased.

SUMMARY OF THE INVENTION

Therefore, an object of the present invention is to provide a multiplex transmission apparatus that realizes reduction in the number of optical receivers for optical-electrical conversion and reduction in cost by changing an installation position of a light source. The multiplex transmission apparatus can also realize an efficient receiving system using a phased array antenna capable of extracting a plurality of element signals at a time.

The present invention has the following features to attain the object above.

A first aspect of the present invention is directed to a multiplex transmission apparatus that converts a plurality of signals varied in phase into an optical signal and, after transmission, extracts a desired signal therefrom, the apparatus including:

a signal source for outputting a main local oscillation signal having a predetermined frequency fx;

a first delay controller for giving a predetermined time delay τx to the main local oscillation signal outputted from the signal source and outputting the main local oscillation signal as a first sub-local oscillation signal;

a first optical transmitter for converting the main local oscillation signal outputted from the signal source into a first optical signal having a wavelength λ1;

second optical transmitter for converting the first sub-local oscillation signal outputted from the first delay controller into a second optical signal having a wavelength λ2;

a first optical multiplexer for multiplexing the first optical signal outputted from the first optical transmitter and the second optical signal outputted from the second optical transmitter;

a first optical transmission path for transmitting an optical signal outputted from the first optical multiplexer;

an optical separator for separating, for each wavelength, the optical signal transmitted through the first optical transmission path and outputting the first and second optical signals;

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to the first main element signal and a second sub-element signal obtained by giving a predetermined time delay τb to the second main element signal, and outputting a multiplexed signal as a first sub-signal group;

a first optical modulator for modulating the first optical signal outputted from the optical separator with the main signal group outputted from the first multiplexer;

a second optical modulator for modulating the second optical signal outputted from the optical separator with the first sub-signal group outputted from the second multiplexer;

a second optical multiplexer for multiplexing the first optical signal outputted from the first optical modulator and the second optical signal outputted from the second optical modulator;

a second optical transmission path for transmitting an optical signal outputted from the second optical multiplexer; and an optical receiver for carrying out square-law detection on the optical signal transmitted through the second optical transmission path, and outputting a signal that uniquely corresponds to either one of the first main and sub-element signals and the second main and sub-element signals.

In the above first aspect, two signal groups varied in phase are dealt as optical signals varied in wavelength for multiplexing and transmission. The optical signals are subjected to modulation in advance with a plurality of local oscillation signals having a predetermined phase difference from each other equivalent to that of desired element signal. Thus, the multiplex transmission apparatus that extracts the desired element signal can be realized at low cost.

According to a second aspect, in the first aspect, the apparatus further includes one or more second delay controllers for giving each different time delay to the main local oscillation signal outputted from the signal source, and outputting the main local oscillation signal as a second sub-local oscillation signal;

one or more third optical transmitters for converting the second sub-local oscillation signal outputted from the corresponding second delay controller into a third optical signal having each different wavelength;

one or more third multiplexers for multiplexing a third sub-element signal obtained by giving each different time delay to the first main element signal and a fourth sub-element signal obtained by giving each different time delay to the second main element signal, and outputting a multiplexed signal as a second sub-signal group; and one or more third optical modulators for modulating the third optical signal outputted from the optical separator with the second sub-signal group outputted from the corresponding third multiplexer, wherein the first optical multiplexer multiplexes the first optical signal outputted from the first optical transmitter, the second optical signal outputted from the second optical transmitter, and one or more the third optical signals outputted from the third optical transmitters, the optical separator separates, for each wavelength, the optical signal transmitted through the first optical transmission path, and outputting the first and second signals, and one or more the third optical signals, the second optical multiplexer multiplexes the first optical signal outputted from the first optical modulator, the second optical signal outputted from the second optical modulator, and one or more the third optical signals outputted from the third optical modulators, and the optical receiver carries out square-law detection on the optical signal transmitted through the second optical transmission path, and outputs a signal that uniquely corresponds to either one of the first main element signal (and the first and third sub-element signals), and the second main element signal (and the second and fourth sub-element signals).

In the above second aspect, more signals can be optically multiplexed and transmitted. Also, the optical signals are subjected to modulation in advance with the local oscillation signals. Thus, the multiplex transmission apparatus that extracts the desired element signal can be achieved with high accuracy and quality.

According to a third aspect, in the first aspect, in the first delay controller, the predetermined time delay τx is set to be equal to either one of the time delay τa of the first sub-element signal with respect to the first main element signal and the time delay τb of the second sub-element signal with respect to the second main element signal, and the optical receiver outputs either one of a signal having a frequency |fx−fa| obtained by converting the first main and sub-element signals and a signal having a frequency |fx−fb| obtained by converting the second main and sub-element signals.

In the above third aspect, two signal groups varied in phase are dealt as optical signals varied in wavelength for multiplexing and transmission. The optical signals are subjected to modulation in advance with a plurality of local oscillation signals having a predetermined phase difference from each other equivalent to that of desired element signal. Thus, the multiplex transmission apparatus that extracts the desired element signal with its frequency converted into a frequency equivalent to a frequency difference from the local oscillation signal can be realized at low cost.

According to a fourth aspect, in the third aspect, the frequency fa of the first main and sub-element signals coincides with the frequency fb of the second main and sub-element signals.

In the above fourth aspect, two signal groups having the same frequency but varied in phase are dealt as optical signals varied in wavelength for multiplexing and transmission. The optical signals are subjected to modulation in advance with a plurality of local oscillation signals having a predetermined phase difference from each other equivalent to that of desired element signal. Thus, the multiplex transmission apparatus that extracts the desired element signal with its frequency converted into the frequency equal to the other element signal can be achieved at low cost.

According to a fifth aspect, in the fourth aspect, in the signal source, the predetermined frequency fx is set to be double the frequency fa of the first main and sub-element signals (or the frequency fb of the second main and sub-element signals), and the optical receiver outputs either one of the signal having the frequency fa and corresponding to the first main and sub-element signals and the signal having the frequency fb and corresponding to the second main and sub-element signals.

In the above fifth aspect, two signal groups having the same frequency but varied in phase are dealt as optical signals varied in wavelength for multiplexing and transmission. The optical signals are subjected to modulation in advance with a plurality of local oscillation signals having a predetermined phase difference from each other equivalent to that of desired element signal and having the frequency double the frequency of the element signal. Thus, the multiplex transmission apparatus that extracts the desired element signal with its frequency unchanged can be achieved at low cost.

According to a sixth aspect, in the third aspect, the first and second main and sub-element signals are angle-modulated signals.

In the sixth aspect, angle modulation such as frequency modulation (FM) is used when the element signals are modulated. Thus, the multiplex transmission apparatus that extracts the desired element signal with high quality while suppressing interference from the other element signal can be achieved at low cost.

According to a seventh aspect, in the third aspect, the first and second main and sub-element signals are ASK (Amplitude Shift Keying)-modulated signals, in the signal source, the predetermined frequency fx is set to be equal to either one of the frequency fa of the first main and sub-element signals and the frequency fb of the second main and sub-element signals), and the optical receiver demodulates either one of the first main and sub-element signals and the second main and sub-element signals, and outputs a corresponding baseband signal.

In the above seventh aspect, ASK (Amplitude Shift Keying) modulation is used when the elements signals are modulated. The frequency of the local oscillation signal is set to be equal to the frequency of the desired element signal. Thus, the multiplex transmission apparatus that extracts the baseband information of the desired element signal can be realized at low cost.

According to an eighth aspect, in the first aspect, in the first delay controller, the predetermined time delay τx is set to be equal in amount and opposite in sign to either one of the time delay τa of the first sub-element signal with respect to the first main element signal and the time delay τb of the second sub-element signal with respect to the second main element signal, and the optical receiver outputs either one of a signal having a frequency fx+fa obtained by converting the first main and sub-element signals and a signal having a frequency fx+fb by converting the second main and sub-element signals.

In the above eighth aspect, the multiplex transmission apparatus that extracts the desired element signal with its frequency converted into a frequency equivalent to the frequency sum of the desired element signal and the local oscillation signal can be achieved at low cost.

According to a ninth aspect, in the first aspect, the signal source outputs a modulated signal having the frequency fx obtained by modulating a predetermined de-spreading code Cx as an original signal, the first main and sub-element signals are modulated signals obtained by spectrum-spreading a baseband signal Da with a predetermined spreading code Ca, and, the second main and sub-element signals are modulated signals obtained by spectrum-spreading a baseband signal Db with a predetermined spreading code Cb.

In the above ninth aspect, spectrum-spreading signals are used as the element signals. Thus, the multiplex transmission apparatus that extracts the baseband information of the desired element signal can be realized at low cost.

According to a tenth aspect, in the ninth aspect, in the signal source, the predetermined de-spreading code Cx is set to be as either one of a de-spreading code of the spreading code Ca for the first main and sub-element signals and a de-spreading code of the spreading code Cb for the second main and sub-element signals, in the first delay controller, the predetermined time delay τx is set to be equal to either one of the time delay τa of the first sub-element signal with respect to the first main element signal and the time delay τb of the second sub-element signal with respect to the second main element signal, and the optical receiver outputs either one of a signal having a frequency |fx−fa| obtained by spectrum-de-spreading the first main and sub-element signals and a signal having a frequency |fx−fb| obtained by spectrum-de-spreading the second main and sub-element signals.

In the above tenth aspect, the multiplex transmission apparatus that extracts the desired element signal with its baseband information converted into a frequency difference components with respect to the local oscillation signal can be realized at low cost.

According to an eleventh aspect, in the tenth aspect, the frequency fa of the first main and sub-element signals coincides with the frequency fb of the second main and sub-element signals.

In the above eleventh aspect, the multiplex transmission apparatus that extracts the desired element signal with its baseband information converted into the frequency equal to that of the other element signal can be achieved at low cost.

According to a twelfth aspect, in the eleventh aspect, in the signal source, the predetermined frequency fx is set to be double the frequency fa of the first main and sub-element signals (or the frequency fb of the second main and sub-element signals), and the optical receiver outputs either one of a signal having the frequency fa obtained by spectrum-de-spreading the first main and sub-element signals and a signal having the frequency fb by spectrum-de-spreading the second main and sub-element signals.

In the above twelfth aspect, the multiplex transmission apparatus that extracts the baseband information of the desired element signal with its frequency unchanged can be realized at low cost.

According to a thirteenth aspect, in the ninth aspect, in the signal source, the predetermined de-spreading code Cx is set to be as either one of a de-spreading code of the spreading code Ca for the first main and sub-element signals and a de-spreading code of the spreading code Cb for the second main and sub-element signals, in the first delay controller, the predetermined time delay τx is set to be equal in amount and opposite in sign to either one of the time delay τa of the first sub-element signal with respect to the first main element signal and the time delay τb of the second sub-element signal with respect to the second main element signal, and the optical receiver outputs either one of a signal having a frequency fx+fa obtained by spectrum-de-spreading the first main and sub-element signals and a signal having a frequency fx+fb obtained by spectrum-de-spreading the second main and sub-element signals.

In the above thirteenth aspect, the multiplex transmission apparatus that extracts the desired element signal with its frequency converted into a frequency equivalent to the frequency sum of the desired element signal and the local oscillation signal can be achieved at low cost.

A fourteenth aspect of the present invention is directed to a multiplex transmission apparatus that converts a plurality of signals varied in phase into an optical signal and, after transmission, simultaneously extracts a plurality of desired signals therefrom, the apparatus including:

a first signal source for outputting a first main local oscillation signal having a predetermined frequency fx;

a second signal source for outputting a second main local oscillation signal having a predetermined frequency fy;

a first delay controller for giving a predetermined time delay τx to the first main local oscillation signal outputted from the first signal source and outputting the first main local oscillation signal as a first sub-local oscillation signal;

a second delay controller for giving a predetermined time delay τy to the second main local oscillation signal outputted from the second signal source and outputting the second main local oscillation signal as a second sub-local oscillation signal;

a third multiplexer for multiplexing the first main local oscillation signal outputted from the first signal source and the second main local oscillation signal outputted from the second signal source, and outputting a multiplexed signal as a main local oscillation signal group;

a fourth multiplexer for multiplexing the first sub-local oscillation signal outputted from the first delay controller and the second sub-local oscillation signal outputted from the second delay controller, and outputting a multiplexed signal as a sub-local oscillation signal group;

a first optical transmitter for converting the main local oscillation signal group outputted from the third multiplexer into a first optical signal having a wavelength λ1;

a second optical transmitter for converting the first sub-local oscillation signal group outputted from the fourth multiplexer into a second optical signal having a wavelength λ2;

a first optical multiplexer for multiplexing the first optical signal outputted from the first optical transmitter and the second optical signal outputted from the second optical transmitter;

a first optical transmission path for transmitting an optical signal outputted from the first optical multiplexer;

an optical separator for separating, for each wavelength, the optical signal transmitted through the first optical transmission path and outputting the first and second optical signals;

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to the first main element signal and a second sub-element signal obtained by giving a predetermined time delay τb to the second main element signal, and outputting a multiplexed signal as a first sub-signal group;

a first optical modulator for modulating the first optical signal outputted from the optical separator with the main signal group outputted from the first multiplexer;

a second optical modulator for modulating the second optical signal outputted from the optical separator with the first sub-signal group outputted from the second multiplexer;

a second optical multiplexer for multiplexing the first optical signal outputted from the first optical modulator and the second optical signal outputted from the second optical modulator;

a second optical transmission path for transmitting an optical signal outputted from the second optical multiplexer;

an optical receiver for carrying out square-law detection on the optical signal transmitted through the second optical transmission path, and outputting signals that uniquely correspond to the first main and sub-element signals and the second main and sub-element signals; and a filter for separating the signal outputted from the optical receiver by passing signal components uniquely corresponding to the first main and sub-element signals and signal components uniquely corresponding to the second main and sub-element signals for output.

In the above fourteenth aspect, two signal groups varied in phase are dealt as optical signals varied in wavelength for multiplexing and transmission. The optical signals are subjected to modulation in advance with a plurality of local oscillation groups including local oscillation signals having a predetermined phase difference from each other equivalent to that of desired element signals. Thus, the multiplex transmission apparatus that simultaneously extracts the desired plurality of element signals can be realized at low cost.

According to a fifteenth aspect, in the fourteenth aspect, the apparatus further includes one or more third signal sources for outputting a third main local oscillation signal having a predetermined frequency; and one or more third delay controllers for giving each different time delay to the third main local oscillation signal outputted from the third signal source, and outputting the third main local oscillation signal as a third sub-local oscillation signal; wherein the third optical multiplexer multiplexes the first main local oscillation signal outputted from the first signal source, the second main local oscillation signal outputted from the second signal source, and one or more the third main local oscillation signals outputted from the third signal sources, and outputs a multiplexed signal as a main local oscillation group, the fourth optical multiplexer multiplexes the first sub-local oscillation signal outputted from the first delay controller, second sub-local oscillation signal outputted from the second delay controller, and one or more the third sub-local oscillation signals outputted from the third delay controllers, and outputs a multiplexed signal as a first sub-local oscillation signal group, the first multiplexer multiplexes the first main element signal having the predetermined frequency fa, the second main element signal having the predetermined frequency fb, and one or more third element signals having a predetermined frequency, and outputs a multiplexed signal as a main signal group, the second multiplexer multiplexes the first sub-element signal obtained by giving the predetermined time delay τa to the first main element signal, the second sub-element signal obtained by giving the predetermined time delay τb to the second main element signal, and one or more third sub-element signals obtained by giving each predetermined time delay to the third main element signals, and outputs a multiplexed signal as a first sub-signal group, the optical receiver carries out square-law detection on the optical signal transmitted through the second optical transmission path, and outputs signals that uniquely correspond to the first main and sub-element signals, the second main and sub-element signals, and one or more the third main and sub-element signals, and the filter separates the signal outputted from the optical receiver by passing signal components uniquely corresponding to the first main and sub-element signals, signal components uniquely corresponding to the second main and sub-element signals, and signal components uniquely corresponding to one or more the third main and sub-element signals for output.

In the above fifteenth aspect, three or more signal groups varied in phase are dealt as optical signals varied in wavelength for multiplexing and transmission. The optical signals are subjected to modulation in advance with a plurality of local oscillation groups including local oscillation signals having a predetermined phase difference from each other equivalent to that of desired element signals. Thus, the multiplex transmission apparatus that simultaneously extracts the desired plurality of element signals can be realized at low cost.

According to a sixteenth aspect, in the fourteenth aspect, the apparatus further includes one or more third delay controllers for giving each different time delay to the first main local oscillation signal outputted from the first signal source, and outputting the first main local oscillation signal as a third sub-local oscillation signal;

one or more fourth delay controllers for giving each different time delay to the second main local oscillation signal outputted from the second signal source, and outputting the second main local oscillation signal as a fourth sub-local oscillation signal;

one or more fifth multiplexers for multiplexing the third sub-local oscillation signal outputted from the corresponding third delay controller and the fourth sub-local oscillation signal outputted from the corresponding fourth delay controller, and outputting a multiplexed signal as a second sub-local oscillation signal group;

one or more third optical transmitters for converting the second sub-local oscillation signal group outputted from the corresponding fifth multiplexer into a third optical signal having a different wavelength;

one or more sixth multiplexers for multiplexing a third sub-element signal obtained by giving a different time delay to the first main element signal and a fourth sub-element signal obtained by giving a different time delay to the second main element signal, and outputting a multiplexed signal as a second sub-signal group; and one or more third optical modulator for modulating the third optical signal outputted from the optical separator with the second sub-signal group outputted from the corresponding sixth multiplexer, wherein the first optical multiplexer multiplexes the first optical signal outputted from the first optical transmitter, the second optical signal outputted from the second optical transmitter, and one or more the third optical signals outputted from the third optical transmitters, the optical separator separates, for each wavelength, the optical signal transmitted through the first optical transmission path, and outputting the first and second signals, and one or more the third optical signals, the optical multiplexer multiplexes the first optical signal outputted from the first optical modulator, the second optical signal outputted from the second optical modulator, and one or more the third optical signals outputted from the third optical modulators, and the optical receiver carries out square-law detection on the optical signal transmitted through the second optical transmission path, and outputs signals that uniquely correspond to the first main element signal (and the first and third sub-element signals) and the second main element signal (and the second and fourth sub-element signals), and the filter separates the signal outputted from the optical receiver by passing signal components uniquely corresponding to the first main element signal (and the first and third sub-element signals), and signal components uniquely corresponding to the second main element signals (and the second and fourth sub-element signals)

In the above sixteenth aspect, more signals can be optically multiplexed and transmitted. Also, the optical signals are subjected to modulation in advance with the local oscillation signals. Thus, the multiplex transmission apparatus that extracts the desired element signals can be achieved with higher accuracy and quality.

According to a seventeenth aspect, in the fourteenth aspect, in the first delay controller, the predetermined time delay $\tau x$ is set to be equal to the time delay $\tau a$ of the first sub-element signal with respect to the first main element signal, in the second delay controller, the predetermined time delay $\tau y$ is set to be equal to the time delay $\tau b$ of the second sub-element signal with respect to the second main element signal, and the optical receiver outputs a signal having a frequency $|fx-fa|$ obtained by converting the first main and sub-element signals and a signal having a frequency $|fx-fb|$ obtained by converting the second main and sub-element signals.

In the above seventeenth aspect, the multiplex transmission apparatus that simultaneously extracts the desired element signals with their frequency converted into a frequency equivalent to a frequency difference from the local oscillation signal can be realized at low cost.

According to an eighteenth aspect, in the seventeenth aspect, the frequency fa of the first main and sub-element signals coincides with the frequency fb of the second main and sub-element signals.

In the above eighteenth aspect, the multiplex transmission apparatus that extracts the desired element signals with their frequency converted into the frequency equal to those of the other element signals can be achieved at low cost.

According to a nineteenth aspect, in the seventeenth aspect, the first and second main and sub-element signals are angle-modulated signals.

In the above nineteenth aspect, angle modulation such as frequency modulation (FM) is used when the element signals are modulated. Thus, the multiplex transmission apparatus that extracts the desired element signals with high quality while suppressing interference from the other element signal can be achieved at low cost.

According to a twentieth aspect, in the fourteenth aspect, in the first delay controller, the predetermined time delay $\tau x$ is set to be equal in amount and opposite in sign to the time delay $\tau a$ of the first sub-element signal with respect to the first main element signal, in the second delay controller, the predetermined time delay $\tau y$ is set to be equal in amount and opposite in sign to the time delay $\tau b$ of the second sub-element signal with respect to the second main element signal, and the optical receiver outputs a signal having a frequency fx+fa obtained by converting the first main and sub-element signals and a signal having a frequency fx+fb by converting the second main and sub-element signals.

In the above twentieth aspect, the multiplex transmission apparatus that extracts the desired element signals with their frequency converted into a frequency equivalent to the frequency sum of the desired element signals and the local oscillation signal can be achieved at low cost.

According to a twenty-first aspect, in the fourteenth aspect, the first signal source outputs a modulated signal having the frequency fx obtained by modulating a predetermined de-spreading code Cx as an original signal, the second signal source outputs a modulated signal having the frequency fy obtained by modulating a predetermined de-spreading code Cy as an original signal, the first main and sub-element signals are modulated signals obtained by spectrum-spreading a baseband signal Da with a predetermined spreading code Ca, and the second main and sub-element signals are modulated signals obtained by spectrum-spreading a baseband signal Db with a predetermined spreading code Cb.

In the above twenty-first aspect, spectrum-spreading signals are used as the element signals. Thus, the multiplex transmission apparatus that simultaneously extracts the baseband information of the desired element signals can be realized at low cost.

According to a twenty-second aspect, in the twenty-first aspect, in the first signal source, the predetermined de-spreading code Cx is set to be a de-spreading code of the spreading code Ca for the first main and sub-element signals, in the second signal source, the predetermined de-spreading code Cy is set to be a de-spreading code of the spreading code Cb for the second main and sub-element signals, in the first delay controller, the predetermined time delay τx is set to be equal to the time delay τa of the first sub-element signal with respect to the first main element signal, in the second delay controller, the predetermined time delay τy is set to be equal to the time delay τb of the second sub-element signal with respect to the second main element signal, and the optical receiver outputs a signal having a frequency |fx−fa| obtained by spectrum-de-spreading the first main and sub-element signals and a signal having a frequency |fx−fb| obtained by spectrum-de-spreading the second main and sub-element signals.

In the above twenty-second aspect, the multiplex transmission apparatus that extracts the desired element signals with their baseband information converted into a frequency difference components with respect to the local oscillation signal can be realized at low cost.

According to a twenty-third aspect, in the twenty-second aspect, the frequency fa of the first main and sub-element signals coincides with the frequency fb of the second main and sub-element signals.

In the above twenty-third aspect, the multiplex transmission apparatus that extracts the desired element signals with their frequency converted into the frequency equal to those of the other element signals can be achieved at low cost.

According to a twenty-fourth aspect, in the twenty-second aspect, the spreading code Ca coincides with the spreading code Cb.

In the above twenty-fourth aspect, it is possible to realize, at low cost, the multiplex transmission apparatus that extracts the desired element signals with their baseband information converted into a frequency difference components with respect to the local oscillation even the spreading codes coincide with each other.

According to a twenty-fifth aspect, in the twenty-first aspect, in the first signal source, the predetermined de-spreading code Cx is set to be the de-spreading code of the spreading code Ca for the first main and sub-element signals, in the second signal source, the predetermined de-spreading code Cy is set to be the de-spreading code of the spreading code Cb for the second main and sub-element signals, in the first delay controller, the predetermined time delay τx is set to be equal in amount and opposite in sign to the time delay τa of the first sub-element signal with respect to the first main element signal, in the second delay controller, the predetermined time delay τy is set to be equal in amount and opposite in sign to the time delay τb of the second sub-element signal with respect to the second main element signal, and the optical receiver outputs a signal having a frequency fx+fa obtained by spectrum-de-spreading the first main and sub-element signals and a signal having a frequency fx+fb obtained by spectrum-de-spreading the second main and sub-element signals.

In the above twenty-fifth aspect, the multiplex transmission apparatus that extracts the baseband information of the desired element signals with their frequency converted into a frequency equivalent to the frequency sum of the desired element signals and the local oscillation signal can be achieved at low cost.

A twenty-sixth aspect of the present invention is directed to a multiplex transmission apparatus that converts a plurality of signals varied in phase into an optical signal and, after transmission, extracts a desired signal therefrom, the apparatus including:

signal source for outputting a main local oscillation signal having a predetermined frequency fx;

a first delay controller for giving a predetermined time delay τx to the main local oscillation signal outputted from the signal source and outputting the main local oscillation signal as a first sub-local oscillation signal;

a first optical transmitter for converting the main local oscillation signal outputted from the signal source into a first optical signal having a wavelength λ1;

a second optical transmitter for converting the first sub-local oscillation signal outputted from the first delay controller into a second optical signal having a wavelength λ2;

a first optical multiplexer for multiplexing the first optical signal outputted from the first optical transmitter and the second optical signal outputted from the second optical transmitter;

a first optical multiplexer/demultiplexer, capable of passing an optical signal received at a first terminal thereof for output from a second terminal thereof, passing an optical signal received at the second terminal thereof for output from a third terminal thereof, for passing an optical signal outputted from the first optical multiplexer coupled to the first terminal for output from the second terminal thereof;

an optical transmission path coupled to the second terminal of the first optical multiplexer/demultiplexer for bi-directionally transmitting optical signals;

a second optical multiplexer/demultiplexer, capable of separating an optical signal received at a fourth terminal thereof for each wavelength for output from fifth and sixth terminals thereof and multiplexing optical signals received at the fifth and sixth terminals for output from the fourth terminal, for receiving the optical signal outputted from the second terminal of the first optical multiplexer/demultiplexer at the fourth terminal through the optical transmission path coupled thereto, separating the optical signal for each wavelength, and outputting the first optical signal from the fifth terminal and the second optical signal from the sixth terminal;

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to the first main element signal and a second sub-element signal obtained by giving a predetermined time delay τb to the second main element signal, and outputting a multiplexed signal as a first sub-signal group;

a first optical modulator for modulating the first optical signal outputted from the fifth terminal of the second optical multiplexer/demultiplexer with the main signal group outputted from the first multiplexer, and reflecting a modulated signal for output to the fifth terminal of the second optical multiplexer/demultiplexer;

a second optical modulator for modulating the second optical signal outputted from the sixth terminal of the second optical multiplexer/demultiplexer with the first sub-signal group outputted from the second multiplexer, and reflecting a modulated signal for output to the sixth terminal of the second optical multiplexer/demultiplexer; and an optical receiver for carrying out square-law detection on the optical signal outputted from the third terminal of the optical multiplexer/demultiplexer, and outputting a signal that uniquely corresponds to either one of the first main and sub-element signals and the second main and sub-element signals.

In the above twenty-sixth aspect, two signal groups varied in phase are dealt as optical signals varied in wavelength for multiplexing and transmission. The optical signals are subjected to modulation in advance with a plurality of local oscillation signals having a predetermined phase difference from each other equivalent to that of desired element signal. In such structure, the two signal groups are converted by a reflective-type optical modulator into optical signals. Furthermore, a single optical fiber is used for bi-directional transmission. Thus, the multiplex transmission apparatus that extracts the desired element signal can be realized with a simple structure at low cost.

A twenty-seventh aspect of the present invention is directed to a multiplex transmission apparatus that converts a plurality of signals varied in phase into an optical signal and, after transmission, extracts a desired signal therefrom, the apparatus including:

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to the first main element signal and a second sub-element signal obtained by giving a predetermined time delay τb to the second main element signal, and outputting a multiplexed signal as a first sub-signal group;

a first optical transmitter for converting the main signal group outputted from the first multiplexer into a first optical signal having a wavelength λ1;

a second optical transmitter for converting the sub-signal group outputted from the second multiplexer into a second optical signal having a wavelength λ2;

a first optical multiplexer for multiplexing the first optical signal outputted from the first optical transmitter and the second optical signal outputted from the second optical transmitter;

an optical transmission path for transmitting an optical signal outputted from the first optical multiplexer;

an optical separator for separating the optical signal transmitted through the optical transmission path for each wavelength, and outputting the first and second optical signals;

a signal source for outputting a main local oscillation signal having a predetermined frequency fx;

a first delay controller for giving a predetermined time delay τx to the main local oscillation signal outputted from the signal source and outputting the main local oscillation signal as a first sub-local oscillation signal;

a first optical modulator for modulating the first optical signal outputted from the optical separator with the main local oscillation signal outputted from the signal source;

a second optical modulator for modulating the second optical signal outputted from the optical separator with the first sub-local oscillation signal outputted from the first delay controller;

a second optical multiplexer for multiplexing the first optical signal outputted from the first optical modulator and the second optical signal outputted from the second optical modulator; and an optical receiver for carrying out square-law detection on an optical signal outputted from the second optical multiplexer, and outputting a signal that uniquely corresponds to either one of the first main and sub-element signals and the second main and sub-element signals.

In the above twenty-seventh aspect, two signal groups varied in phase are dealt as optical signals varied in wavelength for multiplexing and transmission. The optical signals are subjected to re-modulation with a plurality of local oscillation signals having a predetermined phase difference from each other equivalent to that of desired element signal. Thus, the multiplex transmission apparatus that extracts the desired element signal can be realized.

According to a twenty-eighth aspect, in the twenty-seventh aspect, the apparatus further includes one or more third multiplexers for multiplexing a third sub-element signal obtained by giving each different time delay to the first main element signal and a fourth sub-element signal obtained by giving each different time delay to the second main element signal, and outputting a multiplexed signal as a second sub-signal group;

one or more third optical transmitters for converting the second sub-local oscillation signal outputted from the corresponding third multiplexer into a third optical signal group having each different wavelength;

one or more second delay controllers for giving each different time delay to the main local oscillation signal outputted from the signal source, and outputting the main local oscillation signal as a second sub-local oscillation signal; and one or more third optical modulators for modulating the third optical signal outputted from the optical separator with the second sub-local oscillation group outputted from the corresponding second delay controller, wherein the first optical multiplexer multiplexes the first optical signal outputted from the first optical transmitter, the second optical signal outputted from the second optical transmitter, and one or more the third optical signals outputted from the third optical transmitters, the optical separator separates, for each wavelength, the optical signal transmitted through the optical transmission path, and outputting the first and second signals, and one or more the third optical signals, the second optical multiplexer multiplexes the first optical signal outputted from the first optical modulator, the second optical signal outputted from the second optical modulator, and one or more the third optical signals outputted from the third optical modulators, and the optical receiver carries out square-law detection on the optical signal outputted from the second optical multiplexer, and outputs a signal that uniquely corresponds to either one of the first main element signal (and the first and third sub-element signals), and the second main element signal (and the second and fourth sub-element signals).

In the above twenty-eighth aspect, more signals can be optically multiplexed and transmitted. Also, the optical signals are subjected to re-modulation with the local oscillation signals. Thus, the multiplex transmission apparatus that extracts the desired element signal can be achieved with high accuracy and quality.

According to a twenty-ninth aspect, in the twenty-seventh aspect, the signal source outputs a modulated signal having the frequency fx obtained by modulating a predetermined de-spreading code Cx as an original signal, the first main and sub-element signals are modulated signals obtained by spectrum-spreading a baseband signal Da with a predetermined spreading code Ca, and the second main and sub-element signals are modulated signals obtained by spectrum-spreading a baseband signal Db with a predetermined spreading code Cb.

In the above twenty-ninth aspect, spectrum-spreading signals are used as the element signals. Thus, the multiplex transmission apparatus that extracts the baseband information of the desired element signal can be realized at low cost.

A thirtieth aspect of the present invention is directed to a multiplex transmission apparatus that converts a plurality of signals varied in phase into an optical signal and, after transmission, extracts a desired signal therefrom, the apparatus including:

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay $\tau a$ to the first main element signal and a second sub-element signal obtained by giving a predetermined time delay $\tau b$ to the second main element signal, and outputting a multiplexed signal as a first sub-signal group;

a first optical transmitter for converting the main signal group outputted from the first multiplexer into a first optical signal having a wavelength $\lambda 1$;

a second optical transmitter for converting the first sub-signal group outputted from the second multiplexer into a second optical signal having a wavelength $\lambda 2$;

a first optical multiplexer for multiplexing the first optical signal outputted from the first optical transmitter and the second optical signal outputted from the second optical transmitter;

an optical transmission path for transmitting an optical signal outputted from the first optical multiplexer;

an optical separator for separating the optical signal transmitted through the optical transmission path for each wavelength, and outputting the first and second optical signals;

a first signal source for outputting a first main local oscillation signal having a predetermined frequency fx;

a second signal source for outputting a second main local oscillation signal having a predetermined frequency fy;

a first delay controller for giving a predetermined time delay $\tau x$ to the first main local oscillation signal outputted from the first signal source and outputting the first main local oscillation signal as a first sub-local oscillation signal;

a second delay controller for giving a predetermined time delay $\tau y$ to the second main local oscillation signal outputted from the second signal source and outputting the second main local oscillation signal as a second sub-local oscillation signal;

a third multiplexer for multiplexing the first main local oscillation signal outputted from the first signal source and the second main local oscillation signal outputted from the second signal source, and outputting a multiplexed signal as a main local oscillation signal group;

a fourth multiplexer for multiplexing the first sub-local oscillation signal outputted from the first delay controller and the second sub-local oscillation signal outputted from the second delay controller, and outputting a multiplexed signal as a first sub-local oscillation signal group;

a first optical modulator for modulating the first optical signal outputted from the optical separator with the main local oscillation signal group outputted from the third multiplexer;

a second optical modulator for modulating the second optical signal outputted from the optical separator with the first sub-local oscillation signal group outputted from the fourth multiplexer;

a second optical multiplexer for multiplexing the first optical signal outputted from the first optical modulator and the second optical signal outputted from the second optical modulator;

an optical receiver for carrying out square-law detection on an optical signal outputted from the second optical multiplexer, and outputting a signal that uniquely corresponds to the first main and sub-element signals and the second main and sub-element signals; and a filter for separating the signal outputted from the optical receiver by passing signal components uniquely corresponding to the first main and sub-element signals and signal components uniquely corresponding to the second main and sub-element signals for output.

In the above thirtieth aspect, two signal groups varied in phase are dealt as optical signals varied in wavelength for multiplexing and transmission. The optical signals are subjected to re-modulation with a plurality of local oscillation groups including local oscillation signals having a predetermined phase difference from each other equivalent to that of desired element signals. Thus, the multiplex transmission apparatus that simultaneously extracts the desired plurality of element signals can be realized at low cost.

According to a thirty-first aspect, in the thirtieth aspect, the apparatus further includes one or more third signal generators for outputting a third main local oscillation signal having a predetermined frequency; and one or more third delay controllers for giving each different time delay to the third main local oscillation signal outputted from the corresponding third signal source, and outputting the third main local oscillation signal as a third sub-local oscillation signal, wherein the first multiplexer multiplexes a first main element signal having a predetermined frequency fa, a second main element signal having a predetermined frequency fb, and one or more third main element signals having the predetermined frequency, and outputting a multiplexed signal as a main signal group, the second multiplexer multiplexes a first sub-element signal obtained by giving a predetermined time delay τa to the first main element signal, a second sub-element signal obtained by giving a predetermined time delay τb to the second main element signal, and one or more third sub-element signals obtained by giving each predetermined time delay to the corresponding third main element signal, and outputting a multiplexed signal as a first sub-signal group, the third multiplexer multiplexes the first main local oscillation signal outputted from the first signal source, the second main local oscillation signal outputted from the second signal source, and the third main local oscillation signals outputted from one or more the third signal sources, and outputting a multiplexed signal as a main local oscillation signal group, the fourth multiplexer multiplexes the first sub-local oscillation signal outputted from the first delay controller, the second sub-local oscillation signal outputted from the second delay controller, and one or more the third sub-local oscillation signals outputted from one or more the third delay controllers, and outputting a multiplexed signal as a first sub-local oscillation signal group, the optical receiver carries out square-law detection on the optical signal outputted from the second optical multiplexer, and outputs a signal that uniquely corresponds to the first main and sub-element signals, the second main and sub-element signals, and one or more the third main and sub-element signals, and the filter for separating the signal outputted from the optical receiver by passing signal components uniquely corresponding to the first main and sub-element signals, signal components uniquely corresponding to the second main and sub-element signals, and signal components uniquely corresponding to one or more the third main and sub-element signals for output.

In the above thirty-first aspect, three or more signal groups varied in phase are dealt as optical signals varied in wavelength for multiplexing and transmission. The optical signals are subjected to re-modulation with a plurality of local oscillation groups including local oscillation signals having a predetermined phase difference from each other equivalent to that of desired element signals. Thus, the multiplex transmission apparatus that simultaneously extracts the desired plurality of element signals can be realized at low cost.

According to a thirty-second aspect, in the thirtieth aspect, the apparatus further includes one or more sixth multiplexers for multiplexing a third sub-element signal obtained by giving a different time delay to the first main element signal and a fourth sub-element signal obtained by giving a different time delay to the second main element signals, and outputting a multiplexed signal as a second sub-signal group;

one or more third optical transmitters for converting the second sub-signal group outputted from the corresponding sixth multiplexer into a third optical signal having a different wavelength;

one or more third delay controllers for giving each different time delay to the first main local oscillation signal outputted from the first signal source, and outputting the first main local oscillation signal as a third sub-local oscillation signal;

one or more fourth delay controllers for giving each different time delay to the second main local oscillation signal outputted from the second signal source, and outputting the second main local oscillation signal as a fourth sub-local oscillation signal;

one or more fifth multiplexers for multiplexing the third sub-local oscillation signal outputted from the corresponding third delay controller and the fourth sub-local oscillation signal outputted from the corresponding fourth delay controller, and outputting a multiplexed signal as a second sub-local oscillation signal group; and one or more third optical modulator for modulating the third optical signal outputted from the optical separator with the second sub-signal group outputted from the corresponding fifth multiplexer, wherein the first optical multiplexer multiplexes the first optical signal outputted from the first optical transmitter, the second optical signal outputted from the second optical transmitter, and one or more the third optical signals outputted from the third optical transmitters, the optical separator separates, for each wavelength, the optical signal transmitted through the first optical transmission path, and outputting the first and second signals, and one or more the third optical signals, the second optical multiplexer multiplexes the first optical signal outputted from the first optical modulator, the second optical signal outputted from the second optical modulator, and one or more the third optical signals outputted from the third optical modulators, the optical receiver carries out square-law detection on the optical signal transmitted through the second optical multiplexer, and outputs a signal that uniquely correspond to the first main element signal (and the first and third sub-element signals) and the second main element signal (and the second and fourth sub-element signals), and the filter separates the signal outputted from the optical receiver by passing signal components uniquely corresponding to the first main element signal (and the first and third sub-element signals), and signal components uniquely corresponding to the second main element signals (and the second and fourth sub-element signals).

In the above thirty-second aspect, more signals can be optically multiplexed and transmitted. Also, the optical signals are subjected to modulation in advance with the local oscillation signals. Thus, the multiplex transmission apparatus that extracts the desired element signals can be achieved with higher accuracy and quality.

A thirty-third aspect of the present invention is directed to a multiplex transmission method for converting a plurality of signals varied in phase into an optical signal, after transmission, extracting a desired signal therefrom, including the steps of:

converting a plurality of main element signals and a plurality of sub-element signals given each varied phase difference with respect to the corresponding main element signals into a plurality of optical signals varied in wavelength;

modulating, in advance or again, the each of the optical signals with a main local oscillation signal and a sub-local oscillation signal generated by giving, to the main local oscillation signal, a phase difference equal to the phase difference given to the corresponding sub-element signal; and carrying out square detection on the optical signal, converting the optical signal, and extracting a desired main and sub-element signals.

In the above thirty-third aspect, a plurality of signal groups varied in phase are dealt as optical signals varied in wavelength for multiplexing and transmission. The optical signals are subjected to modulation in advance or re-modulation with a plurality of local oscillation signals having a phase difference from each other equivalent to that of desired element signals. Thus, it is possible to realize the multiplex transmission method of extracting the desired element signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a multiplex transmission apparatus according to a first embodiment of the present invention;

FIG. 11 is a block diagram showing the structure of a multiplex transmission apparatus according to a fourth embodiment of the present invention;

Figure 2A:
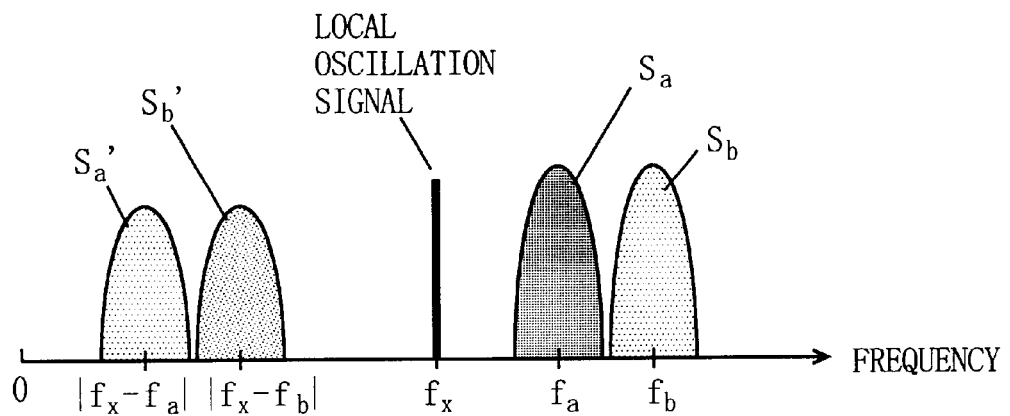
FIGS. 2A and 2B are schematic diagrams illustrating frequency band arrangement of transmission signals according to the first embodiment of the present invention.

DESCRIPTION OF THE PREFERRED EMBODIMENTS (First Embodiment)

FIG. 1 shows the structure of a multiplex transmission apparatus according to a first embodiment of the present invention. In FIG. 1, the multiplex transmission apparatus includes a signal source 101, a delay controller 102, first and second optical transmitter 1031 and 1032, a first optical multiplexer 104, a first optical transmission path 1051, an optical separator 106, first and second multiplexers 1071 and 1072, first and second optical modulators 1081 and 1082, a second optical multiplexer 109, a second optical transmission path 1052, and an optical receiver 110.

Figure 15:
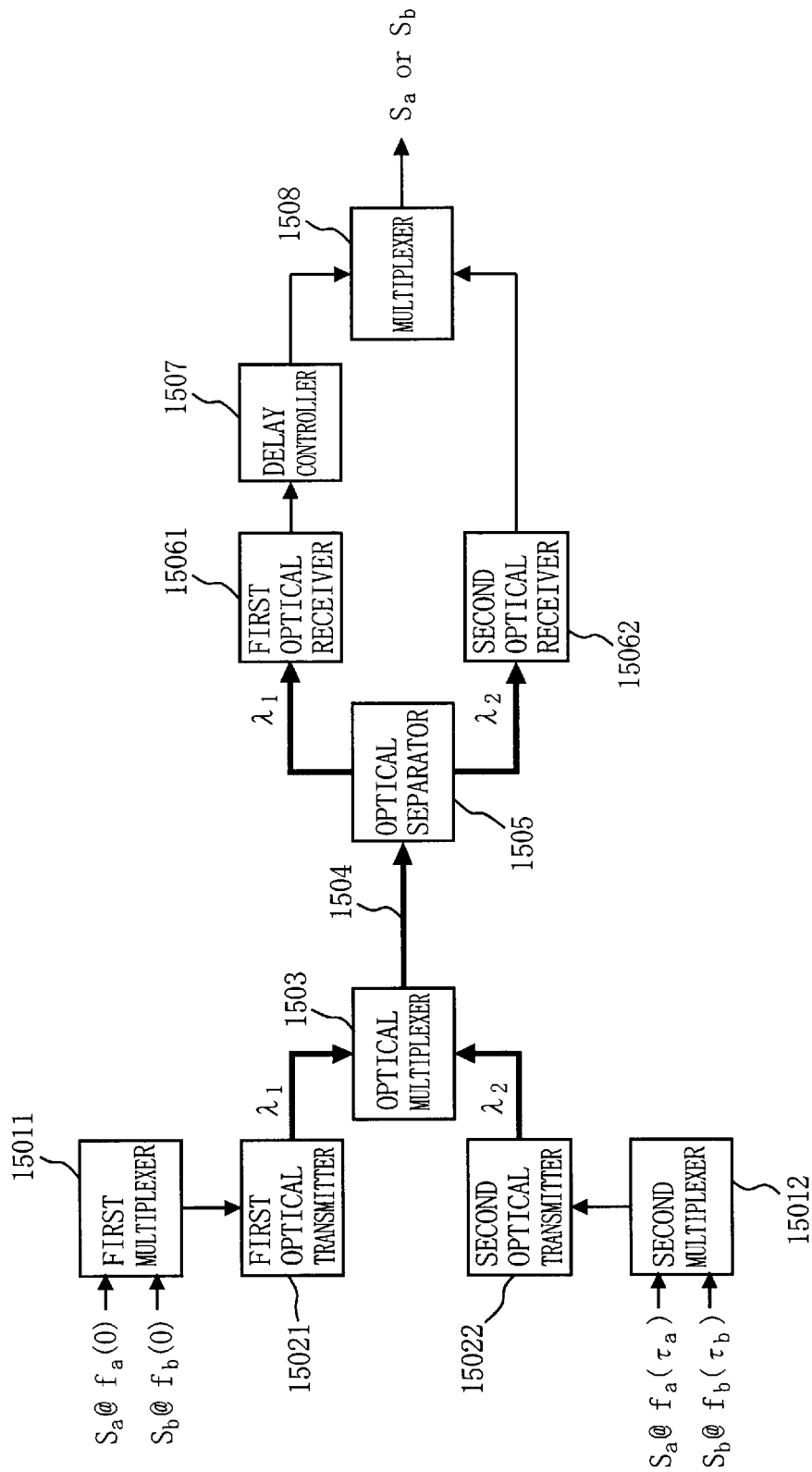
FIG. 15 is a block diagram showing a conventional multiplex transmission apparatus.
Figure 16:
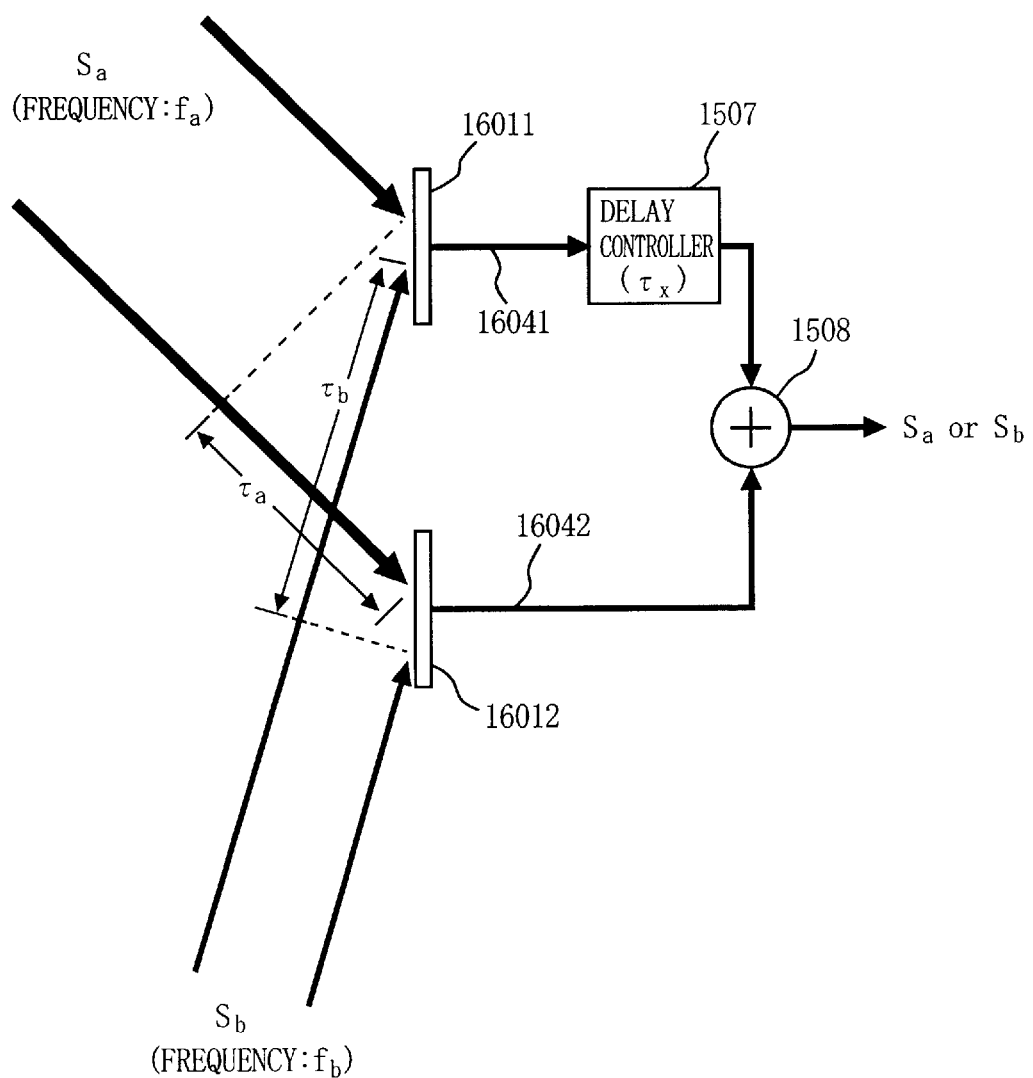
FIG. 16 is a schematic diagram illustrating the basic operating principle of the conventional multiplex transmission apparatus.

Note that, in FIG. 1, signals represented as Sa@fa(0), Sb@fb(0), Sa@fa(τa), and Sb@fb(τb) are the same as those already described with reference to FIG. 15, and therefore provided with the same reference characters and should be understood according the same representation rules. Also, as described with reference to FIG. 16, the present apparatus can be applied to a receiving system using a phased array antenna.

The operation of the present apparatus shown in FIG. 1 is described. The signal source 202 outputs a local oscillation signal having a predetermined frequency fx. Such local oscillation signal is hereinafter referred to as a main local oscillation signal. The delay controller 102 gives a predetermined time delay (phase difference) τx to the main local oscillation signal outputted from the signal source 101, and outputs the resultant signal as a sub-local oscillation signal.

The first optical transmitter 1031 converts the main local oscillation signal outputted from the signal source 101 into a first optical signal having a wavelength λ1 for output. The second optical transmitter 1032 converts the sub-local oscillation signal outputted from the delay controller 102 into a second optical signal having a wavelength λ2 for output.

The first optical multiplexer 104 multiplexes the first and second optical signals outputted from the first and second optical transmitters 1031 and 1032, respectively, for output to the first optical transmission path 1051. The optical separator 106 separates the multiplexed optical signal coming through the first optical transmission path 1051 for each wavelength, and outputs the first optical signal having the wavelength λ1 and the second optical signal having the wavelength λ2.

The first multiplexer 1071 multiplexes the first main element signal Sa having the frequency fa and the second main element signal Sb having the frequency fb for output.

The second multiplexer 1072 multiplexes the first sub-element signal varied in phase (delayed in time) by τa from the first main element signal supplied to the first multiplexer 1071 and the second sub-element signal varied in phase by τb from the second main element signal also supplied to the first multiplexer 1071.

The first optical modulator 1081 is provided correspondingly to the first multiplexer 1071, and supplied with the first optical signal outputted from the optical separator 106. The first optical modulator 1081 modulates the supplied first optical signal with the signal (main element signal group) outputted from the corresponding first multiplexer 1071. Similarly, the second optical modulator 1082 is provided correspondingly to the first multiplexer 1071, and supplied with the first optical signal outputted from the optical separator 106. The first optical modulator 1081 and 1082 modulates the supplied first optical signal with the signal (main element signal group) outputted from the corresponding first multiplexer 1071.

The second optical multiplexer 109 multiplexes the modulated first and second optical signals outputted from the first and second optical modulators 1081 and 1082, and sends the resultant optical signal to the second optical transmission path 1052.

The optical receiver 110 carries out square-law detection, converting the optical signal coming through the second optical transmission path 1052 into electrical signals. Such electrical signals are a signal Sa' equivalent to the first element signal with its frequency converted and a signal Sb' equivalent to the second element signal with its frequency converted. Either one of the signals Sa' and Sb' is obtained from the optical receiver 110. Note that, as stated in Background Art section, the first element signal includes the first main element signal and the first sub-element signal, while the second element signal includes the second main element signal and the second sub-element signal.

Here, the operation of the present multiplex transmission apparatus is described in more detail. First, the first optical signal is modulated in advance by the first optical transmitter 1031 with the main local oscillation signal (frequency fx). Then, the modulated first optical signal is further modulated by the first optical modulator 1081 with the first main element signal (frequency fa) and the second main element signal (frequency fb). Then, the resultant signal is subjected to square-law detection in the optical receiver 110, being converted into an electrical signal having a frequency |fx−fa| and an electrical signal having a frequency |fx−fb|. The frequency spectrums of these electrical signals are exemplary shown in FIGS. 2A and 2B.

Similarly, the first and second sub-element signals carried by the second optical signal are converted by the optical receiver 110 into the electrical signal having a frequency |fx−fa| and the electrical signal having a frequency |fx−fb|.

In the above description, the first element signal is converted into the electrical signal having the frequency (|fx−fa|, for example) equivalent to a difference in modulation frequency between the first optical transmitter 1031 and the first optical modulator 1081. Similarly, the second element signal is converted into the electrical signal having the frequency (|fx−fb|, for example) equivalent to a difference in modulation frequency between the second optical transmitter 1032 and the second optical modulator 1082. At frequency conversion by the optical receiver 110, frequency-sum components occur in frequency-converted components in addition to the frequency-difference components. Therefore, alternatively, the first element signal may be converted into an electrical signal having a frequency equivalent to the sum of the frequencies of the first optical transmitter 1031 and the first optical modulator 1081, that is, fx+fa. The same goes for the second element signal. By detecting the sum of such frequency components, the same operation and effects can be achieved as those achieved by detecting the difference between the frequency components.

Here, the phase of the first (or second) main element signal outputted from the optical receiver 110 is determined by the phase of the main local oscillation signal supplied to the first optical transmitter 1031 and the phase of the first (or second) main element signal supplied to the first optical modulator 1081. Similarly, the phase of the first (or second) sub-element signal outputted from the optical receiver 110 is determined by the phase of the sub-local oscillation signal supplied to the second optical transmitter 1032 and the phase of the first (or second) sub-element signal supplied to the second optical modulator 1082.

For example, consider a case where the phase of the main local oscillation signal supplied to the first optical transmitter 1031 is 0, and the phase of the first main element signal supplied to the first optical modulator 1081 is 0. In this case, the phase of the first main element signal (with its frequency converted) outputted from the optical receiver 110 is 0. Also, consider a case where the phase of the sub-local oscillation signal supplied to the second optical transmitter 1032 is τx, and the phase of the first sub-element signal supplied to the second optical modulator 1082 is τa. In this case, the phase of the first sub-element signal outputted from the optical receiver 110 is τx−τa.

Therefore, for making the first (or second) main and sub-element signals outputted from the optical receiver 110 in phase, the time delay τx in the delay controller 102 is adjusted. With this adjustment, the present apparatus can extract the first (or second) element signal.

In general, such phase interrelation is observed as follows. Signals in phase are constructive, intensifying their amplitudes each other. On the other hand, signals not in phase are destructive, but not necessarily cancelled out each other. At the optical receiver 110, the first and second element signals not in phase differ at least in signal level, and therefore either one of them that is at a higher level can be easily extracted.

Figure 2B:
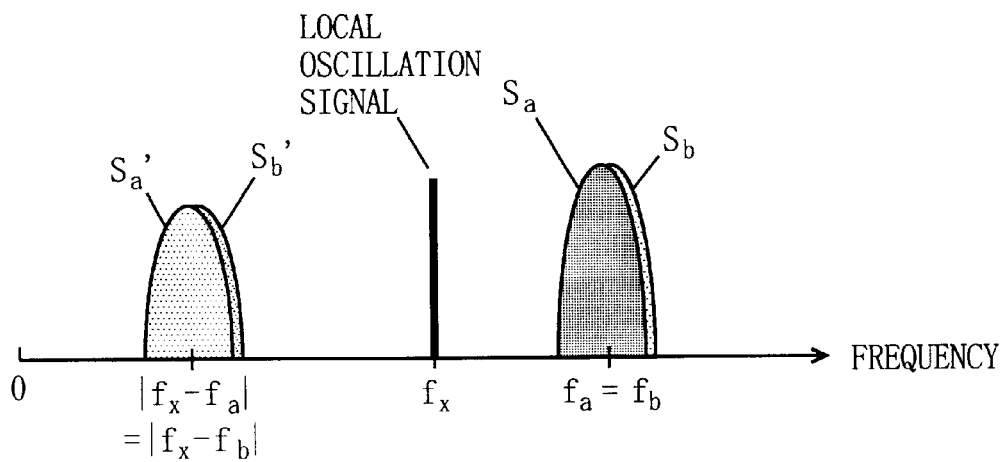

Next, with reference to FIGS. 2A and 2B, the frequency arrangement of the first and second element signals (each including the main element signal and sub-element signal) is described. In general, in multiplex transmission of a plurality of signals, the occupied frequency bands of the signals are so set as not to overlap each other for the purpose of extracting the signals after transmission and preventing degradation in signal quality due to interference. For example, as shown in FIG. 2A, the occupied frequency bands of the first and second element signals are so set as not to overlap each other. In FIG. 2A, the frequency fa of the first element signal does not coincide with the frequency fb of the second element signal.

On the other hand, in the apparatus according to the present embodiment, in addition to the occupied frequency bands of the first and second element signals can be set not to coincide each other as shown in FIG. 2A, and also to overlap or coincide with each other as shown in FIG. 2B. That is, a predetermined element signal can be extracted from a plurality of element signals by using the phase interrelation as stated above. Even if the frequency of the first element signal is equal to that of the second element signal (fa=fb), the phase difference r a between the first main and sub-element signals is different from the phase difference τb between the second main and sub-element signals. Therefore, one of the first and second element signals can be extracted by appropriately adjusting the time delay τx.

In the above example, for extraction of either one of the first and second element signals, the frequency-converted first and second element signals outputted from the optical receiver 110 are equal in occupied frequency band ($|fx-fa|=|fx-fb|$). Therefore, a signal processing apparatus and other components (not shown) following the optical receiver 110 can be simplified in structure, and the requirement of the capabilities for such components can be eased.

Next, the frequency fx of the local oscillation signal in the present apparatus is described. As shown in FIG. 2A, the frequency fx is so set as not to coincide with either of the first and second element signals. With this local oscillation signal, each element signal is converted into a signal having the frequency $|fx-fa|$ or $|fx-fb|$ for extraction.

Figure 3A:
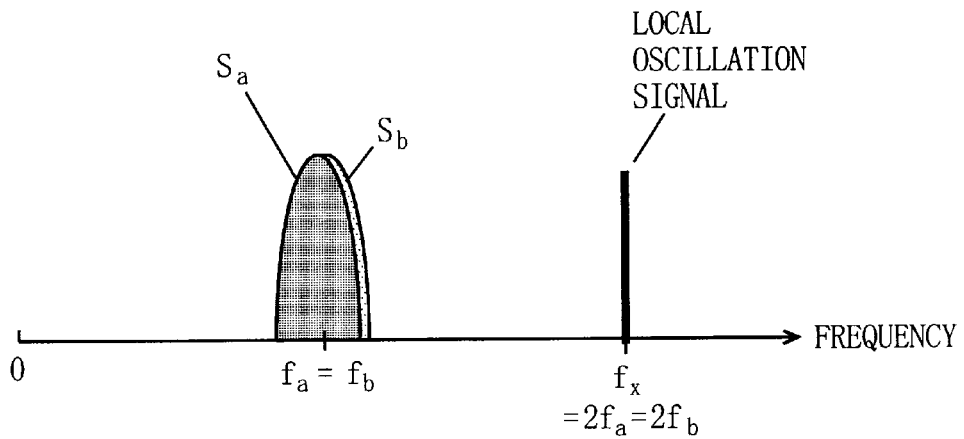
FIGS. 3A and 3B are schematic diagrams illustrating frequency band arrangement of local oscillation signals according to the first embodiment of the present invention.
Figure 3B:
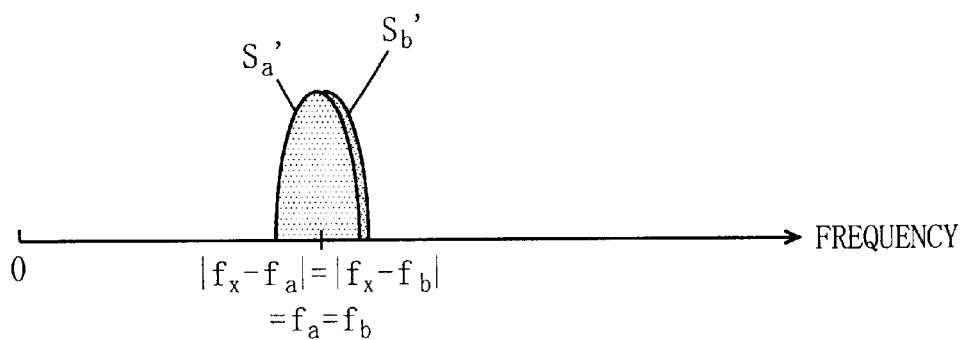

Here, as shown in FIG. 3, the frequency fx is so set to be double the frequency of the first or second element signal (fx=2fa=2fb). This enables each of the frequencies of the frequency-converted first and second element signal outputted from the optical receiver 110 to be converted into the same frequencies as before frequency conversion ($|fx-fa|=|fx-fb|=fa=fb$). Therefore, with such setting, the signal processing apparatus and other components (not shown) following the optical receiver 110 can be more simplified in structure, and the consistency in the entire system can be improved.

As to modulation schemes used in the present embodiment, any modulation schemes such as AM and QPSK can be used for the first and second element signals. If angular modulation, that is, frequency modulation (FM) or phase modulation (PM), is adopted, it is possible to use the low susceptibility of FM signals to unwanted signal components, which is unique to FM signals, for example. In such case, it is possible to suppress interference from the unnecessary element signal with the element signal to be extracted.

Furthermore, if amplitude shift keying (ASK) modulation is utilized, baseband information (Da or Db) of the first or second element signal can be extracted with a simple structure.

Figure 4A:
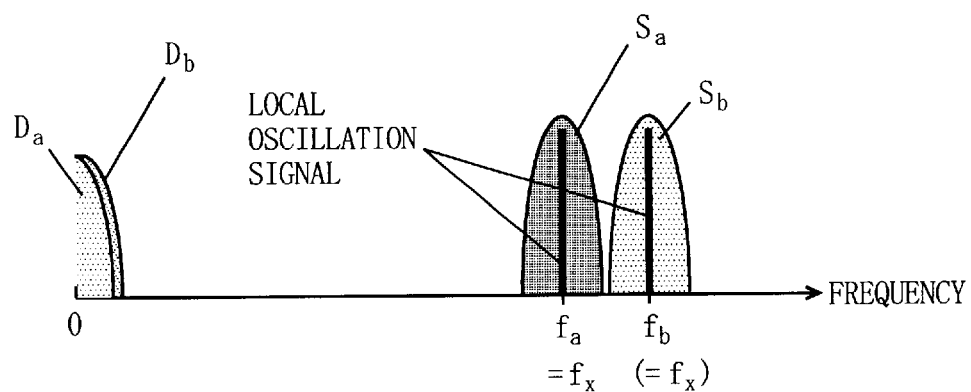
FIGS. 4A and 4B are schematic diagrams illustrating frequency band arrangement of the local oscillation signals depending on modulation schemes of the transmission signals according to the first embodiment of the present invention.
Figure 4B:
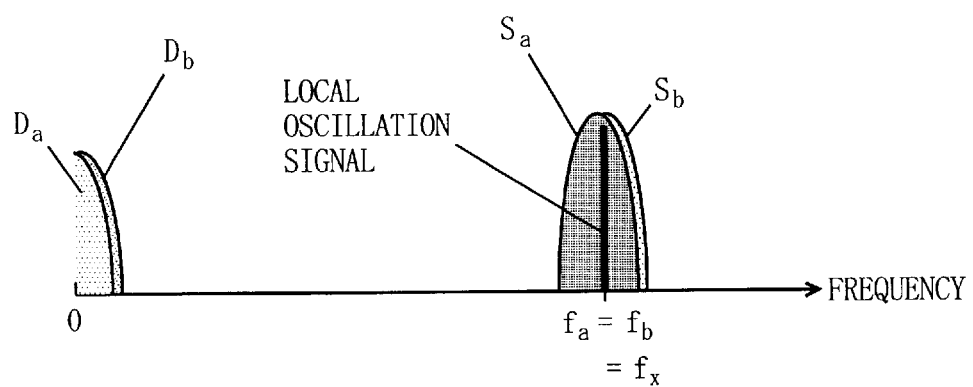

More specifically, for the local oscillation signal, the time delay τx is appropriately adjusted. Also, as shown in FIG. 4A, the frequency fx is so set as to coincide with the frequency of the first or second element signal (fa or fb) With this setting, no frequency difference is observed between the local oscillation signal and the first or second element signal. Therefore, when the first and second element signals are subjected to square-law detection, baseband signals are generated. From the baseband signals, the baseband information, which corresponds to the original signal of the Ask modulated signal (first or second element signal) can be extracted.

If the frequencies of the first and second element signals coincide with each other as shown in FIG. 2B (fa=fb), the frequency fx is so set in advance as to coincide with the frequency fa of the first element signal (or the frequency fb of the second element signal). Then, by adjusting only the time delay τx, the baseband information of the first or second element signal can be extracted with a simple structure.

As described in the foregoing, the multiplex transmission apparatus according to the first embodiment is so structured as to convert signal groups each including a plurality of element signals varied in phase into optical signals. After multiplexing these optical signals for transmission, the apparatus converts them again into electrical signals. In such structured apparatus, the optical signals are modulated in advance with the same local oscillation signals varied in phase by a predetermined amount. Therefore, only a single optical receiver is required, and the light source does not have to be placed in the vicinity of the multiplexers (antennas), thereby reducing the cost of the apparatus and enabling selective extraction of only the desired element signal from the plurality of element signals (signal groups).

Also, even if the occupied frequency bands of the element signals coincide with or overlap each other, only the desired element signal after frequency conversion is selectively extracted, or the frequency of the local oscillation signal is appropriately set. Thus, the frequency of the desired element signal can be extracted being kept the same as before frequency conversion. Therefore, the consistency of the system can be improved.

Furthermore, with FM modulation utilized for modulating the element signals, interference by the element signal other than that to be extracted can be suppressed, thereby enabling extraction of the desired element signal with high quality. Alternatively, with ASK modulation utilized therefor, the frequency of the element signal to be extracted is so set as to coincide with the frequency of the local oscillation signal for extraction. Therefore, the baseband information of the desired element signal can be directly extracted.

In the above description, two element signals (the first and second main and sub-element signals) are supplied to the first and second multipliers 1072 and 1073. Alternatively, the number of element signals to be supplied may be three or more. In such case, as long as there is a difference in phase between the main element signal and the corresponding sub-element signal, an arbitrary element signal can be extracted by appropriately setting the time delay τx.

Furthermore, in the above description, the first and second multiplexers 1071 and 1072 are provided as the multiplexers (antenna elements). Alternatively, the number of the multiplexers may be three or more. In other words, the present apparatus may further include one or more delay controllers, optical transmitters, multiplexers, and optical modulators. Described below is the operation of such additional components.

First, the additional delay controller delays the phase of the electrical signal outputted from the signal source 101 differently from the delay controller 102. The additional optical transmitter converts the electrical signal supplied by the additional delay controller into a third optical signal having a optical wavelength different from the others, and then outputs the third optical signal to the first optical multiplexer 104. The additional multiplexer is provided externally with two signals only varied in phase, and multiplexes these signals. The additional modulator modulates the third optical signal coming as separated by the optical separator 106 with the electrical signal supplied by the additional multiplexer, and then outputs the resultant signal to the second optical multiplexer 109.

In the above structured apparatus, for each of the element signals varied only in phase and supplied to the multiplexers, the time delay is appropriately adjusted so that these signals become constructive each other in the optical receiver 110. Therefore, an arbitrary element signal can be extracted with high accuracy and quality.

(Second Embodiment)

Figure 5:
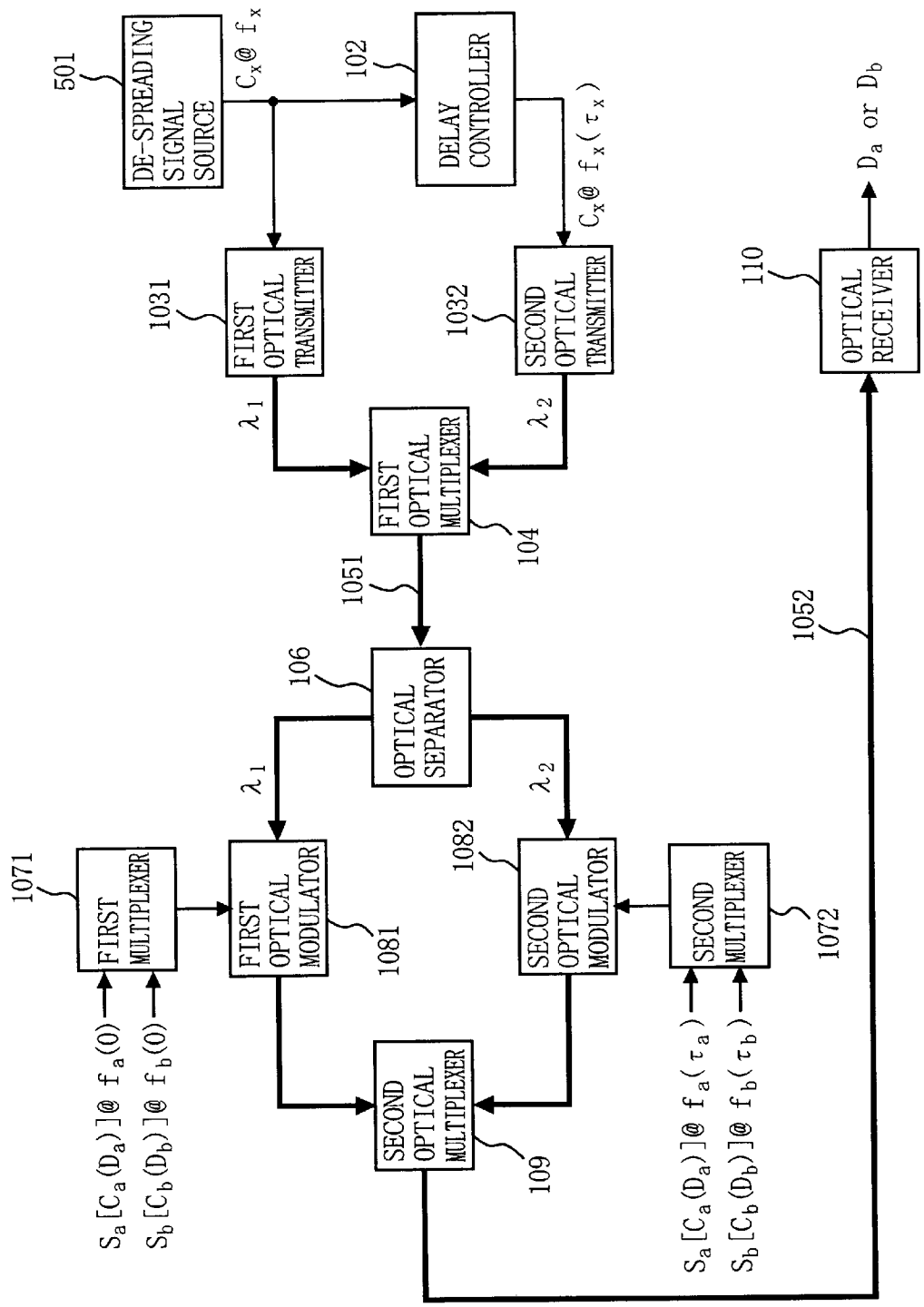
FIG. 5 is a block diagram showing the structure of a multiplex transmission apparatus according to a second embodiment of the present invention.

FIG. 5 shows the structure of a multiplex transmission apparatus according to a second embodiment of the present invention. In FIG. 5, the multiplex transmission apparatus includes a de-spreading signal source 501, a delay controller 102, the first and second optical transmitter 1031 and 1032, the first optical multiplexer 104, the first optical transmission path 1051, the optical separator 106, the first and second multiplexers 1071 and 1072, the first and second optical modulators 1081 and 1082, the second optical multiplexer 109, the second optical transmission path 1052, and the optical receiver 110.

The multiplex transmission apparatus of FIG. 5 is different from that of FIG. 1 in that the de-spreading signal source 501 is provided in place of the signal source 501, and spread spectrum signals are supplied as the first and second element signals.

Note that, in FIG. 5, signals represented as Sa@[Ca(Da)]fa(0), Sb@[Cb(Db)]fb(0), Sa@[Ca(Da)]fa(τa), and Sb@[Cb(Db)]fb(τb) should be understood according to the same rules as used in FIG. 1. These element signals, however, are spread spectrum signals. Also, enclosed in square brackets are a spreading code (Ca or Cb) for the corresponding signal and data carried the that signal (Da or Db) further enclosed in parentheses.

Next, the operation of the present apparatus shown in FIG. 5 is described. The present apparatus is similar to that according to the first embodiment. Therefore, each component similar in operation to that according to the first embodiment are provided with the same reference numeral, and not described herein. Mainly described here is the difference in operation from the apparatus according to the first embodiment.

The present multiplex transmission apparatus uses spread spectrum signals as the first and second element signals. Assume herein that such spread spectrum signals are general CDMA (Code Division Multiple Access) signals. Also assume herein that the first element signal is a signal Sa obtained by spectrum-spreading the baseband information Da with the spreading code Ca, while the second element signal is a signal Sb obtained by spectrum-spreading the baseband information Db with the spreading code Cb. Furthermore, the de-spreading signal source 501 outputs a modulated signal with a predetermined de-spreading code Cx having a predetermined frequency fx.

Although spreading codes of a plurality of spread spectrum signals in a specific area are generally set not to coincide with each other, assume in the following description that the spreading codes Ca and Cb are equal. This is because, in the vicinity of two adjacent areas, for example, it is quite likely that two spread spectrum signals coming therefrom with the same spreading code may arrive simultaneously at the multiplexer. In such case, adjusting the de-spreading code Cx in the de-spreading signal source 501 does not enable selective demodulation of the two spread spectrum signals having the same spreading code.

Figure 6A:
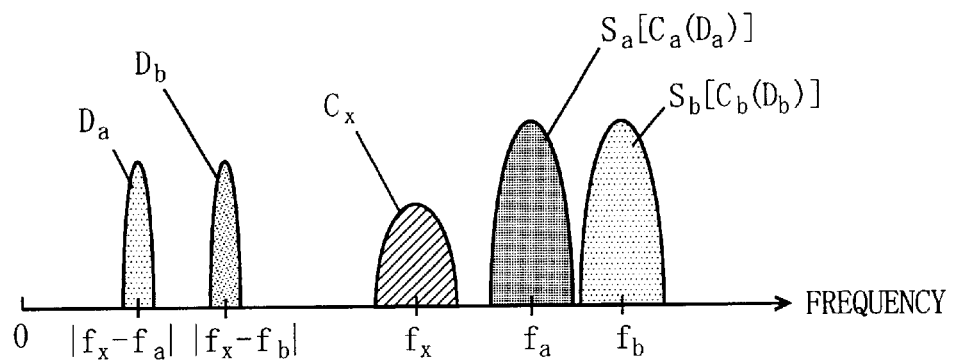
FIGS. 6A and 6B are schematic diagrams illustrating frequency band arrangement of transmission signals according to the second embodiment of the present invention.

Therefore, the predetermined de-spreading code Cx is set as a de-spreading code $Ca^{-1}$ of the spreading code Ca (=Cb). Also, in the delay controller 102, the predetermined time delay τx is set to coincide with the phase difference τa between the first main and sub-element signals. With such settings, the present apparatus can spectrum-de-spreading the first element signal and, as shown in FIG. 6. Obtained from the optical receiver 110 is the baseband information Da of the first element signal at the frequency |fx−fa|.

Similarly, the predetermined de-spreading code Cx is set as a de-spreading code $Ca^{-1}$ of the spreading code Cb (=Ca). Also, in the delay controller 102, the predetermined time delay τx is set to coincide with the phase difference τa between the second main and sub-element signals. With such settings, the present apparatus can spectrum-de-spreading the first element signal and, as shown in FIG. 6. Obtained from the optical receiver 110 is the baseband information Db of the first element signal at the frequency |fx−fb|.

Figure 6B:
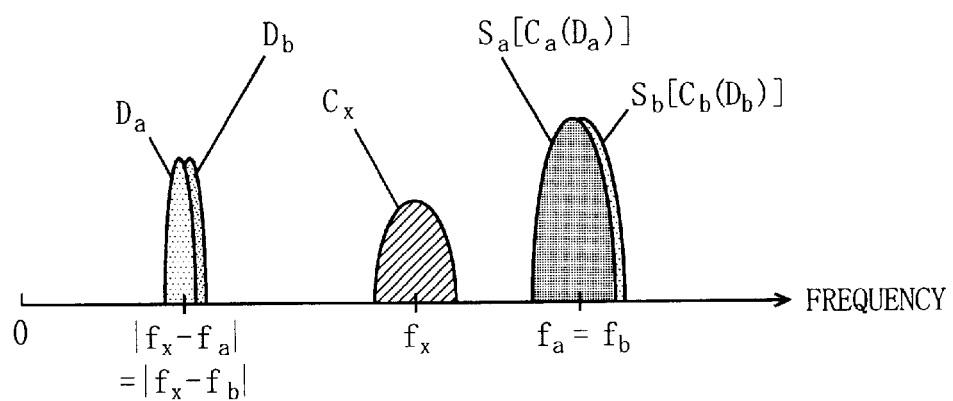
Figure 7A:
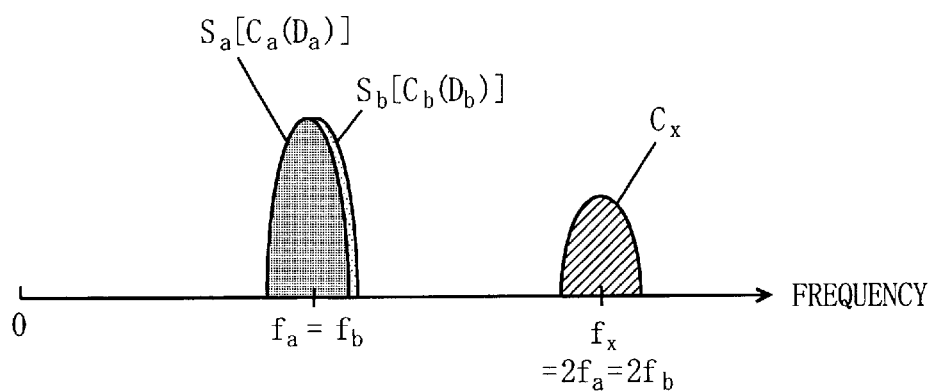
FIGS. 7A and 7B are schematic diagrams illustrating frequency band arrangement of de-spreading signals according to the second embodiment of the present invention.
Figure 7B:
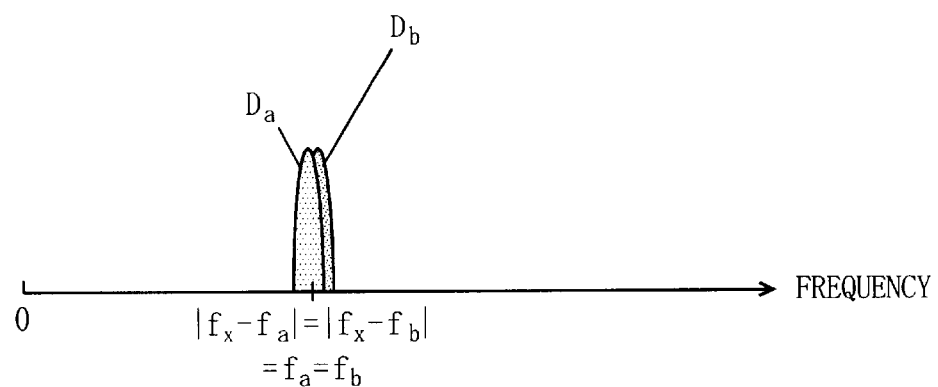

Also, as already described with reference to FIG. 2B, even if the occupied frequency bands of the first and second element signals coincide with or overlap each other, one of the first and second element signals can be obtained. That is, even if, as shown in FIG. 6B, the frequencies of the first and second element signals coincide with each other (fa=fb), as long as the phase difference τa between the first main and sub-element signals is different from the phase difference τb between the second main and sub-element signals, one of the first or second element signal can be extracted by appropriately adjusting the time delay τx.

Therefore, in either case of selecting the first or second element signal, the frequency-converted first and second element signals outputted from the optical receiver 110 are equal in frequency (|fx−fa|=|fx−fb|). Thus, signal processing apparatus and other components (not shown) following the optical receiver 110 can be simplified in structure, and the requirement of the capabilities for such components can be eased.

Also, at frequency conversion of the first and second element signal, frequency-sum components (for example, fx+fa or fx+fb) occur in frequency-converted components in addition to the frequency-difference components. Therefore, extracting such frequency-sum components can achieve the same operation and effects as those achieved by extracting the frequency difference components.

If the spreading codes Ca and Cb are not equal, the predetermined time delay τx of the delay controller 102 is so set as to coincide with τa or τb. Also, the predetermined de-spreading code Cx is set as the de-spreading code $Ca^{-1}$ or $Cb^{-1}$ of the spreading code Ca or Cb. Thus, the apparatus spectrum-de-spreads the first or second element signal, and obtained from the optical receiver 110 is the baseband information Da of the first element signal at the frequency |fx−fa| or the baseband information Db of the second element signal at the frequency |fx−fb|.

Needless to say, in the above case, the baseband information Da of the first element signal or the baseband information Db of the second element signal can be obtained, in some cases, from the optical receiver 110 only by changing the setting of the de-spreading codes without accurately setting the predetermined time delay τx as to coincide with τa or τb. Nevertheless, appropriate setting of the time delay τx makes it possible to suppress an unwanted signal and interference therefrom, and therefore still has the effect of facilitating demodulation.

Next, as with the case shown in FIG. 3, the predetermined frequency fx of the de-spreading signal is so set as to be double the frequency of the first or second element signal (fx=2fa=2fb). This enables each of the frequencies of the frequency-converted first and second element signals outputted from the optical receiver 110 to be converted into the same frequencies as before frequency conversion (|fx−fa|=|fx−fb|=fa=fb). Therefore, with such setting, the signal processing apparatus and other components (not shown) following the optical receiver 110 can be more simplified in structure, and the consistency in the entire system can be improved.

As described above, the multiplex transmission apparatus according to the second embodiment is so structured as to convert signal groups (spread spectrum signal groups) each including spread spectrum signals as element signals varied in phase into optical signals. After multiplexing these optical signals for transmission, the apparatus converts them again into electrical signals. In such structured apparatus, the optical signals are modulated in advance with the same modulating signals varied in phase by a predetermined amount based on the predetermined de-spreading code. Therefore, only a single optical receiver is required, and the light source does not have to be placed in the vicinity of the multiplexers (antennas). Thus, the cost of the apparatus can be reduced, and only the desired spread spectrum signal after de-spreading can be obtained from the spread spectrum signal group, and the corresponding baseband information can be selectively obtained.

Also, even if the occupied frequency bands of the spread spectrum signals coincide with or overlap each other, only the desired spread spectrum signal after de-spreading is selectively extracted, or the frequency of the de-spreading signal is appropriately set. Thus, the frequency of the desired spread spectrum signal can be extracted being kept the same as before frequency conversion. Therefore, the consistency of the system can be improved.

As already stated above, the number of element signals to be supplied to the first and second multiplexers 1071 and 1072 may be three or more. Also, the number of multiplexers including the first and second multiplexers 1071 and 1072 may be three or more.

(Third Embodiment)

Figure 8:
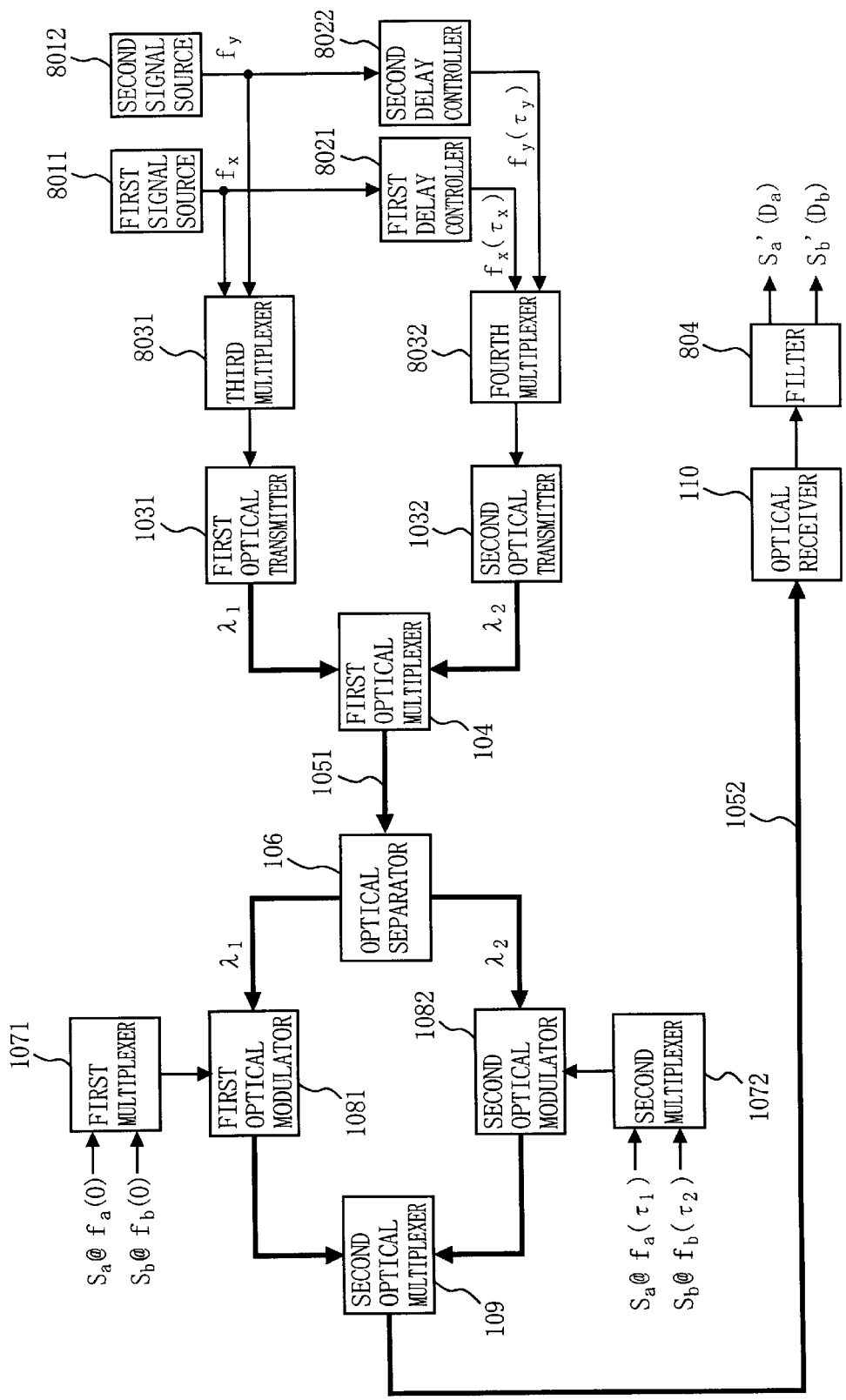
FIG. 8 is a block diagram showing the structure of a multiplex transmission apparatus according to a third embodiment of the present invention.

FIG. 8 shows the structure of a multiplex transmission apparatus according to a third embodiment of the present invention. In FIG. 8, the multiplex transmission apparatus includes the first and second signal sources 8011 and 8012, the first and second delay controllers 8021 and 8022, third and fourth multiplexers 8031 and 8032, the first and second optical transmitter 1031 and 1032, the first optical multiplexer 104, the first optical transmission path 1051, the optical separator 106, the first and second multiplexers 1071 and 1072, the first and second optical modulators 1081 and 1082, the second optical multiplexer 109, the second optical transmission path 1052, the optical receiver 110, and a filter 804.

The present multiplex transmission apparatus is different from that of FIG. 1 in that a plurality of sets of the signal source and the delay controller (in FIG. 8, two sets), the third and fourth multiplexers 8031 and 8032, and the filter 804 are newly provided.

Next, the operation of the multiplex transmission apparatus shown in FIG. 8 is described. The present apparatus is similar to that according to the first embodiment. Therefore, each component similar in operation to that according to the first embodiment are provided with the same reference numeral, and not described herein. Mainly described here is the difference in operation from the apparatus according to the first embodiment.

In the present multiplex transmission apparatus, the first signal source 8011 outputs the first local oscillation signal (main local oscillation signal) having the frequency fx. The first delay controller 8021 provided correspondingly thereto gives the predetermined time delay τx to the main local oscillation signal, and outputs the resultant signal as the first sub-local oscillation signal. Similarly, the second signal source 8012 outputs the second local oscillation signal (main local oscillation signal) having the frequency fy. The second delay controller 8022 provided correspondingly thereto gives the predetermined time delay τy to the main local oscillation signal, and outputs the resultant signal as the second sub-local oscillation signal.

The third multiplexer 8031 multiplexes the first main local oscillation signal outputted from the first signal source 8011 and the second main local oscillation signal outputted from the second signal source 8012, and output the resultant signal to the first optical transmitter 1031. The fourth multiplexer 8032 multiplexes the first sub-local oscillation signal outputted from the first delay controller 8021 and the second sub-local oscillation signal outputted from the second delay controller 8022, and outputs the resultant signal to the second optical transmitter 1032.

The first optical transmitter 1031 converts the local oscillation signal group supplied by the third multiplexer 8031 into a first optical signal. The second optical transmitter 1032 converts the sub-local oscillation signal group supplied by the fourth multiplexer 8032 into a second optical signal. These first and second optical signals are outputted to the first optical multiplexer 104 for multiplexing. Then, the multiplexed signal goes through the first and second optical transmission paths 1051 and 1052 to the optical receiver 110. In the optical receiver 110, the multiplexed signal is converted again into electrical signals, and outputted as the signal Sa' equivalent to the first element signal with its frequency converted and a signal Sb' equivalent to the second element signal with its frequency converted. The filter 804 separately outputs these signals Sa' and Sb' coming from the optical receiver 110 by passing only the frequency components corresponding to either one of the signals.

As described above, unlike the above described multiplex transmission apparatus according to the first embodiment, two sets of the local oscillation signal and the sub-local oscillation signal are used. By controlling the frequency and phase angle of each local oscillation signal, effects unique to the third embodiment can be achieved. Described below is such effects and the operation of the multiplex transmission apparatus according to the present invention in more detail.

Figure 9A:
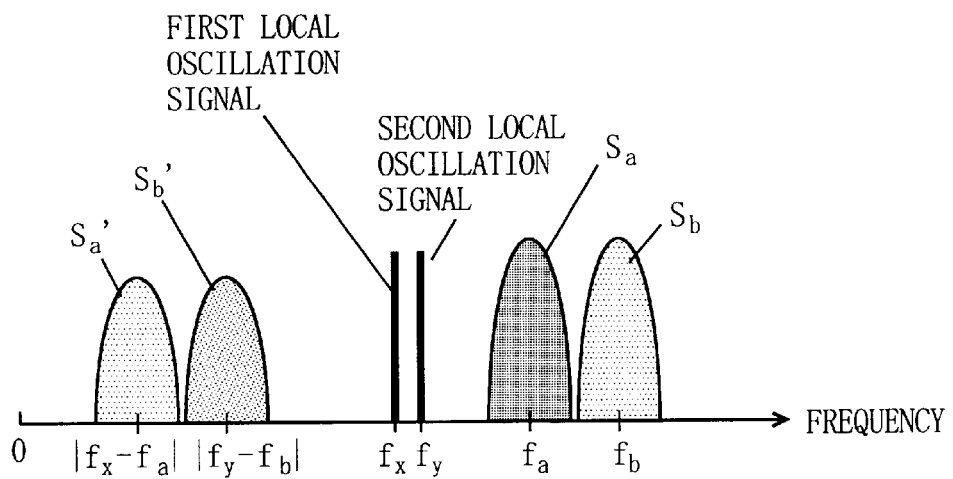
FIGS. 9A and 9B are schematic diagrams illustrating frequency band arrangement of transmission signals according to the third embodiment of the present invention.

First, the first optical transmitter 1031 modulates the first optical signal with the first main local oscillation signal (frequency fx). Then, the first optical modulator 1081 further modulates the modulated first optical signal with the first main element signal (frequency fa) and the second main element signal (frequency fb). The optical receiver 110 carries out square-law detection, converting the received optical signal into an electrical signal having a frequency |fx−fa|, and an electrical signal having a frequency |fx−fb| for output. Here, the frequencies |fx−fa| and |fx−fb| are equivalent to frequency difference components. Such frequency spectrums of these signals are illustrated in FIG. 9A.

Similarly, the optical receiver 110 also converts the first and second sub-element signals carried by the second optical signal into an electrical signal having a frequency |fx−fa| and an electrical signal having a frequency |fx−fb| for output.

Here, the first delay controller 8021 adjusts the time delay τx so that the frequency-converted first main element signal and sub-element signal outputted from the optical receiver 110 become in phase. Thus, the frequency-converted first element signal can be extracted in the optical receiver 110. Similarly, the second delay controller 8022 adjusts the time delay τy so that the frequency-converted second main element signal and sub-element signal outputted from the optical receiver 110 become in phase. Thus, the frequency-converted second element signal can be extracted in the optical receiver 110.

In other words, the present multiplex transmission apparatus is provided with two sets of the signal source and the delay controllers, and separately controls the time delays τx and τy, thereby extracting the first and second element signals at the same time. For example, the filter 804 passes the first element signal having the frequency |fx−fa| and the second element signal having the frequency |fy−fb| for separate output.

Also, at frequency conversion of the first and second element signal, frequency-sum components (for example, fx+fa or fx+fb) occur in frequency-converted components in addition to the frequency-difference components. Therefore, as describe above, extracting such frequency-sum components can achieve the same operation and effects as those achieved by extracting the frequency difference components.

Figure 9B:
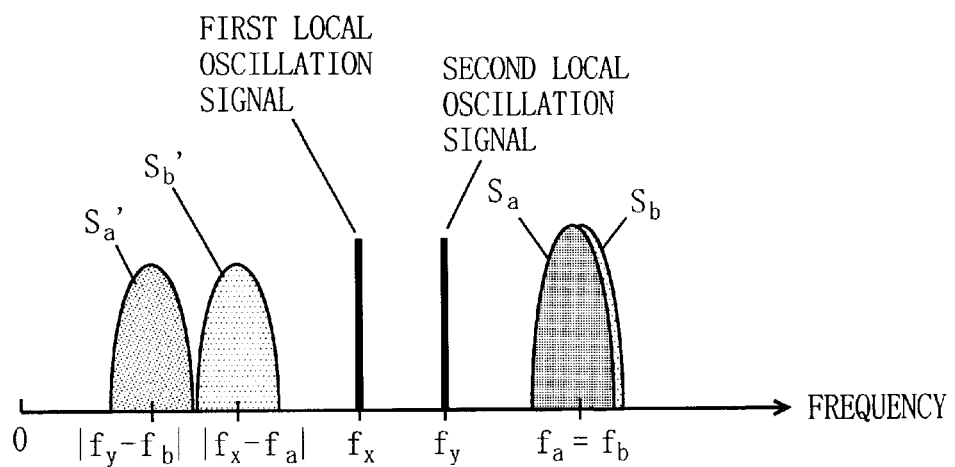

Furthermore, as described with reference to FIG. 2B, when the occupied frequency bands of the first and second element signals coincide with or overlap each other, the following effects can be observed in the present apparatus. That is, even if, as shown in FIG. 9B, the frequencies of the first and second element signals coincide with each other (fa=fb), as long as the phase difference τa between the first main and sub-element signals is different from the phase difference τb between the second main and sub-element signals, either one of the first and second element signals can be extracted by appropriately adjusting the time delay τx. Furthermore, the present apparatus can differently set the frequency fx of the first local oscillation signal and the frequency fy of the second local oscillation signal. Therefore, the frequencies of the frequency-converted first and second element signals outputted from the optical receiver 110 can be adjusted not to coincide with each other. Thus, both signal can be outputted simultaneously from the filter 804.

As one modification of the present multiplex transmission apparatus according to the third embodiment, the multiplex transmission apparatus is so structured as to include first and second de-spreading signal sources in place of the first and second signal sources and uses spread spectrum signals as the first and second element signals.

Thus structured multiplex transmission apparatus with respect to the one according to the third embodiment is similar, in relation, to the multiplex transmission apparatus shown in FIG. 5 with respect to the one shown in FIG. 1, and therefore not illustrated. The operation of the multiplex transmission apparatus according to the modification is now described. Here, the first element signal is the signal Sa obtained by spectrum-spreading the baseband information Da with the spreading code Ca, while the second element signal is the signal Sb obtained by spectrum-spreading the baseband information Db with the spreading code Cb. Furthermore, the first de-spreading signal source outputs the modulated signal with the predetermined de-spreading code Cx having the predetermined frequency fx (first de-spreading signal), while the second de-spreading signal source outputs a modulated signal with a predetermined de-spreading code Cy having a predetermined frequency fy (second de-spreading signal).

Figure 10A:
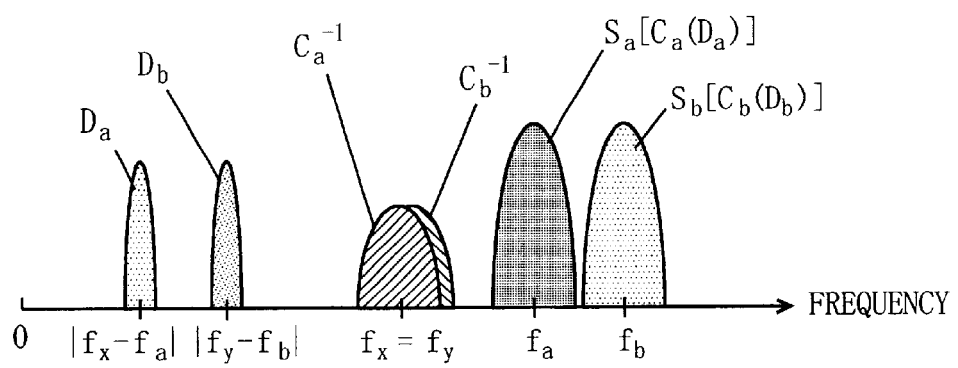
FIGS. 10A and 10B are schematic diagrams illustrating frequency band arrangement of de-spreading signals depending on the frequencies of the transmission signals according to the third embodiment of the present invention.

Here, as with the multiplex transmission apparatus of FIG. 5, assume first that the spreading code Ca is equal to the spreading code Cb. In this case, the predetermined time delay τx given to the first de-spreading signal is set to coincide with the phase difference τa between the first main and sub-element signals, and the predetermined time delay τy given to the second de-spreading signal is set to coincide with the phase difference τb between the second main and sub-element signals. With this setting, the first element signal is spectrum-de-spread. Outputted from the optical receiver 110 are the baseband information Da of the first element signal at the frequency |fx−fa| and the baseband information Db of the second element signal at the frequency |fy−fb|. FIG. 10A shows the frequency arrangement of the signals as described above.

Furthermore, also as with the multiplex transmission apparatus of FIG. 5, assume next that the spreading code Ca is not equal to the spreading code Cb. In this case, the predetermined time delay τx is set to coincide with the phase difference τa. Also, the predetermined de-spreading code Cx is set as a de-spreading code $Ca^{-1}$ of the spreading code Ca and the predetermined de-spreading code Cy is set as a de-spreading code $Cb^{-1}$ of the spreading code Cb. With such settings, as with the above, the baseband information Da of the first element signal and the baseband information Db of the second element signal can be obtained.

Figure 10B:
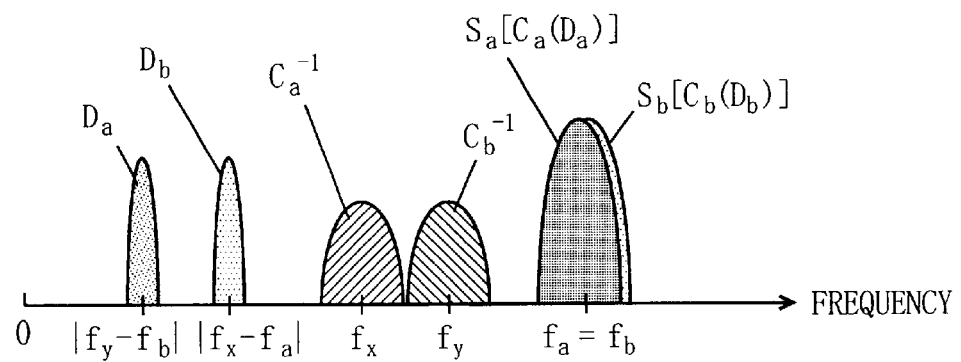

Still further, even if the frequencies of the first and second element signals coincide with each other, the frequencies fx and fy of the first and second de-spreading signals are so set not to coincide with each other as shown in FIG. 10B. With this setting, it is possible to adjust the frequencies of the spectrum-de-spread first and second element signals (baseband information) outputted from the optical receiver 110 not to coincide with each other. Thus, in the present apparatus, both element signals can be outputted from the filter 804 at the same time.

As described in the foregoing, the multiplex transmission apparatus according to the third embodiment is so structured as to convert signal groups each including a plurality of element signals varied in phase into optical signals. After multiplexing these optical signals for transmission, the apparatus converts them again into electrical signals. In such structured apparatus, the optical signals are modulated in advance with the local oscillation signal groups each including a plurality of local oscillation signals varied in phase by a predetermined amount. Therefore, only a single optical receiver is required, and the light source does not have to be placed in the vicinity of the multiplexers (antennas). Thus, the cost of the apparatus can be reduced. Also, from the signal group, a plurality of desired element signals after frequency conversion can be extracted simultaneously.

Furthermore, even if the occupied frequency bands of the element signals coincide with or overlap each other, a plurality of desired element signals after frequency conversion can be extracted simultaneously by appropriately setting the frequencies of the local oscillation signals.

Still further, spread spectrum signals are used as the element signals. These spread spectrum signals are modulated in advance with the modulating signal groups based on the predetermined de-spreading codes instead of the local oscillation signal groups. Thus, from the de-spreading signal group, only the baseband information of a desired spread spectrum signal after de-spreading can be selectively extracted.

Note that the number of element signals (hereinafter, a natural number M) supplied to the first and second multiplexers 1071 and 1072 may be three or more, as described above.

Also, the number of local oscillation signals (hereinafter, a natural number N) supplied to the third and fourth multiplexers 8031 and 8032 may be three or more. In other words, the present apparatus may includes one or more signal sources each generating a local oscillation signal having each different frequency for output to the third multiplexer 8031, and one or more delay controllers each differently delaying the phase of the local oscillation signal outputted from the signal source for output to the fourth multiplexer 8032. In this case, if the number of signal sources, that is, N, and the number of delay controllers, that is, M, hold N<M, only N element signals out of M element signals can be extracted simultaneously. If N=M, all element signals can be extracted simultaneously.

Still further, the number of multiplexers (antenna elements) (hereinafter, a natural number P) including the first and second multiplexers 1071 and 1072 may be three or more. In other words, the present apparatus further includes one or more delay controllers, multiplexers on the local oscillation side, optical transmitters, multiplexers corresponding to the antenna elements, and optical modulators. Described below is the operation of such additional components.

First, the additional delay controller delays the phase of the electrical signal outputted from the corresponding first or second signal source 8011 or 8012 differently form the first or second delay controller 8021 or 8022. The additional multiplexer multiplexes the signals supplied by the additional delay controllers. The additional optical transmitter converts an electrical signal supplied by the additional multiplexer into an optical signal having an optical wavelength different from the others, and outputs the optical signal to the first optical multiplexer 104. The additional multiplexer corresponding to the antenna element is supplied with two signals varied only in phase from any other signal for multiplexing. The additional optical modulator modulates, based on the electrical signal from the additional multiplexer, the optical signal separated by the optical separator 106 for output to the second optical multiplexer 109.

In the above structured apparatus, for each of the element signals varied only in phase and supplied to the multiplexers, each time delay is appropriately adjusted so that these signals become constructive each other in the optical receiver 110. Therefore, the element signals can be simultaneously extracted with high accuracy and quality.

Note that, needless to say, the above N and P may be both 3 or more. Also, as described above, each signal source may be a de-spreading signal source.

(Fourth Embodiment)

FIG. 11 shows the structure of a multiplex transmission apparatus according to a fourth embodiment of the present invention. In FIG. 11, the multiplex transmission apparatus includes the signal source 101, the delay controller 102, the first and second optical transmitter 1031 and 1032, the first optical multiplexer 104, a first optical multiplexer/demultiplexer 1105, the optical transmission path 1051, an optical multiplexer/demultiplexer 1106, the first and second multiplexers 1071 and 1072, third and fourth optical modulators 11081 and 11082, and the optical receiver 110.

The present apparatus includes the second optical multiplexer/demultiplexer 1106 in place of the optical separator 106 of FIG. 1. Also, the present apparatus includes the third and fourth optical modulators 11081 and 11082 in place of the first and second optical modulators 1081 and 1082. Furthermore, in the present apparatus, the first optical multiplexer/demultiplexer 1105 is newly provided, the second optical multiplexer 109 and the optical transmission path 1052 are omitted, and the connections of the optical receiver 110 and other components are changed. The optical transmission path 1051 of FIG. 11 is the same as that of FIG. 1.

Next, the operation of the multiplex transmission apparatus shown in FIG. 11 is described. The present apparatus is similar to that according to the first embodiment. Therefore, each component similar in operation to that according to the first embodiment are provided with the same reference numeral, and not described herein. Mainly described here is the difference in operation from the apparatus according to the first embodiment.

The third optical modulator 11081 modulates a first optical signal outputted from the second optical multiplexer/demultiplexer 1106 with a signal group outputted from the first optical multiplexer 1071. Similarly, the fourth optical modulator 11082 modulates a second optical signal outputted from the second optical multiplexer/demultiplexer 1106 with a signal group outputted from the second optical multiplexer 1072. Then, the third and fourth optical modulators 11081 and 11082 reflects each modulated optical signal in a direction the optical signal before modulation has come from, outputting the modulated signal to the second optical multiplexer/demultiplexer 1106. Therefore, on the optical transmission path 1051, there exist the first and second optical signals from the first optical multiplexer/demultiplexer 1105 to the second optical multiplexer/demultiplexer 1106 and the modulated first and second optical signals from the second optical multiplexer/demultiplexer 1106 to the first optical multiplexer/demultiplexer 1105, passing simultaneously in each reverse direction.

The second optical multiplexer/demultiplexer 1106 multiplexes the first and second optical signals reflected after modulation form the third and fourth optical modulators 11081 and 11082, and sends out the resultant signal to the optical transmission path 1051.

The first optical multiplexer/demultiplexer 1105 has three terminals, first to third. The first optical multiplexer/demultiplexer 1105 receives, at the first terminal, an optical signal outputted from the optical multiplexer 104 connected thereto, and then sends out the optical signal from the second terminal to the optical transmission path 1051 connected thereto. Also, the first optical multiplexer/demultiplexer 1105 receives, at the second terminal, the optical signal outputted from the second optical multiplexer/demultiplexer 1106 through the optical transmission path 1051 connected to the second terminal, then sends out the optical signal from the third terminal to the optical receiver 110 connected thereto.

As described in the foregoing, the multiplex transmission apparatus according to the fourth embodiment is so structured as to convert signal groups each including a plurality of element signals varied in phase into optical signals. After multiplexing these optical signals for transmission, the apparatus converts them again into electrical signals. In such structured apparatus, one optical fiber is shared as a transmission path for the optical signals to go and return. Thus, the cost of the apparatus can be reduced. Also, from the signal group, a desired element signal after frequency conversion can be selectively extracted.

Note that, as with the multiplex transmission apparatus of FIG. 5, the present multiplex transmission apparatus may include a de-spreading signal source in place of the signal source 101, and may use spread spectrum signals as the element signals. Also, as with the multiplex transmission apparatus of FIG. 8, the present apparatus may include a plurality of signal sources (or de-spreading signal sources) and delay controllers. Furthermore, any one or two or all of the above N, M, and P may be 3 or more. Such cases have been described above, and not described again.

(Fifth Embodiment)

Figure 12:
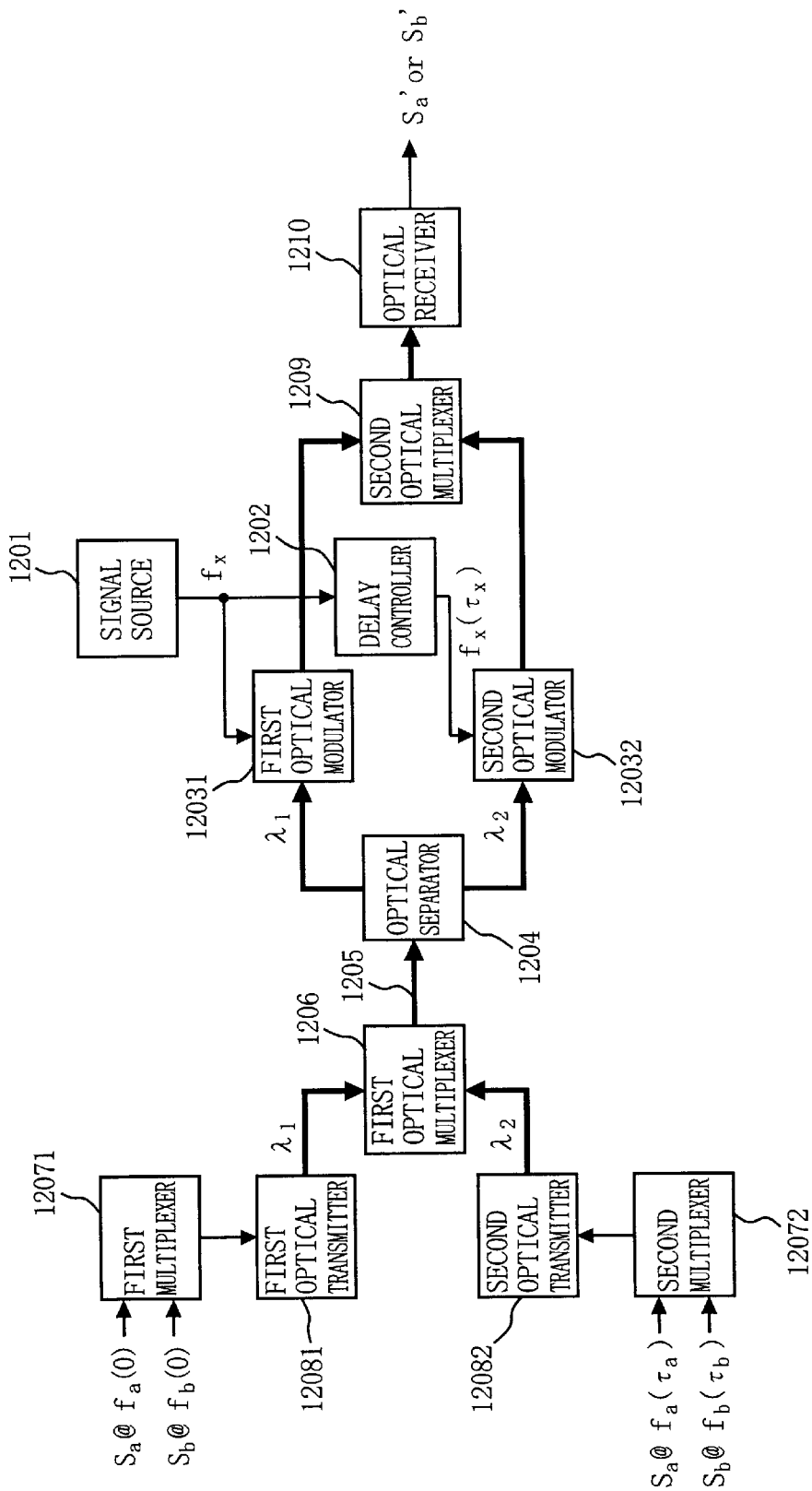
FIG. 12 is a block diagram showing the structure of a multiplex transmission apparatus according to a fifth embodiment of the present invention.

FIG. 12 shows the structure of a multiplex transmission apparatus according to a fifth embodiment of the present invention. In FIG. 12, the multiplex transmission apparatus includes first and second multiplexers 12071 and 12072, first and second optical transmitters 12081 and 12082, a first optical multiplexer 1206, an optical transmission path 1205, an optical separator 1204, a signal source 1201, a delay controller 1202, first and second optical modulators 12031 and 12032, a second optical multiplexer 1209, and an optical receiver 1210.

The multiplex transmission apparatus of FIG. 12 is similar in structure to that of FIG. 1 except that the first and second optical transmitters are replaced in position with the first and second optical modulators. That is, in the case where the structure of the present apparatus is applied to a receiving system using a phased array antenna, the present apparatus is different in structure from that of FIG. 1 in that the first and second optical transmitters 12801 and 12802 are provided as the light sources on the array antenna element side.

Next, the operation of the present apparatus shown in FIG. 12 is described. The first multiplexer 12071 multiplexes the first main element signal Sa having the frequency fa and the second main element signal Sb having the frequency fb for output. The second multiplexer 12072 multiplexes the first sub-element signal having the phase difference (difference in delay time) τa with respect to the first main element signal and the second sub-element signal having the phase difference τb with respect thereto.

The first optical transmitter 12081 converts the signal group outputted from the first multiplexer 12071 into the first optical signal having the wavelength λ1 for output. Similarly, the second optical transmitter 12082 converts the signal group outputted from the second multiplexer 12072 into the second optical signal having the wavelength λ2 for output.

The first optical multiplexer 1206 multiplexes the first optical signal outputted from the first optical transmitter 12081 and the second optical signal outputted from the second optical transmitter 12082, and sends out the resultant signal to the optical transmission path 12085. The optical separator 1204 separates the optical signal coming through the optical transmission path 1205 for each predetermined wavelength, and outputs the first optical signal having the wavelength λ1 and the second optical signal having the wavelength λ2.

The signal source 1201 outputs the local oscillation signal having the predetermined frequency fx. The delay controller 1202 gives the predetermined time delay τx to the local oscillation signal (main local oscillation signal) outputted from the signal source 1201, and outputs the resultant signal as the sub-local oscillation signal.

The first optical modulator 12031 modulates the first optical signal outputted from the optical separator 1204 with the main local oscillation signal outputted from the signal source 1201. Similarly, the first optical modulator 12031 modulates the first optical signal outputted from the optical separator 1204 with the main local oscillation signal outputted from the signal source 1201.

The second optical multiplexer 1209 multiplexes the first optical signal outputted from the first optical modulators 12031 and the second optical signal outputted from the second optical modulators 12032 for output. The optical receiver 1210 carries out square-law detection, converting the optical signal outputted from the optical multiplexer 1209 again into the electrical signals. Obtained from the optical receiver 1210 is the signal Sa' equivalent to the signal obtained by frequency-converting the first element signal or the signal Sb' equivalent to the signal obtained by frequency-converting the second element signal.

Next, the operation and effects of the present multiplex transmission apparatus is described in more detail. As described above, the present apparatus is similar in structure to that according to the first embodiment shown in FIG. 1 except that the first and second optical transmitters are replaced in position with the first and second optical modulators. The effects of the present apparatus are similar to those of FIG. 1.

That is, in the structure of the multiplex transmission apparatus of FIG. 1, the first (second) optical transmitter converts the local oscillation signal coming from the signal source through the delay controller into the first (second) optical signal for output. Thereafter, the first (second) optical modulator modulates again the optical signal with the signal group outputted from the first (second) multiplexer. The modulated optical signals are multiplexed, and subjected to square-law detection.

On the other hand, in the present apparatus, the signal group outputted from the first (second) multiplexer 12071 (12072) is converted into the first (second) optical signal for output. Then, the first (second) optical modulator 12031 (12032) modulates again the optical signal with the local oscillation signal coming from the signal source 1201 through the delay controller 1202. The modulated optical signals are multiplexed, and subjected to square-law detection.

Therefore, as to the first optical signal, for example, modulation is made thereon first with the signal group outputted from the multiplexer 12071, and then with the local oscillation signal from the signal source 1201. In the apparatus of FIG. 1, however, modulation is made thereon first with the local oscillation signal, and then with the signal group. Consequently, the resultant optical signal supplied to the optical receiver is the same between these apparatuses, and arranged as shown in FIGS. 2A and 2B, for example.

In more detail, in the present apparatus, the first main element signal (frequency fa) and the second main element signal (frequency fb) are converted by the first optical transmitter 12081 into the first optical signal. The first optical signal is modulated again by the first optical modulator 12031 with the main local oscillation signal (frequency fx). Then, square-law detection is carried out by the optical receiver 1210, converting the optical signal into the electrical signals having the frequencies |fx−fa| and |fx−fb| for output. Similarly, the first and second sub-element signals converted in the second optical signal are, in the end, converted into the electrical signals having the frequencies |fx−fa| and |fx−fb|.

Note that, as described above, extracting frequency-sum components (for example, fx+fa or fx+fb) can achieve the same operation and effects as those achieved by extracting the frequency difference components.

Here, the phases of the first (second) main and sub-element signals outputted from the optical receiver 1210 are determined by the phases of the first (second) main and sub-element signals supplied to the first and second optical transmitters 12081 and 12082 and the phases of the main and sub-local oscillation signals supplied to the first and second optical modulators 12031 and 12032.

Therefore, the time delay τx is so adjusted at the delay controller 1202 as that the first main and sub-element signals outputted from the optical receiver 1210 become in phase. Thus, the first element signal can be extracted. Also, the time delay τx is so adjusted as that the second main and sub-element signals outputted from the optical receiver 1210 become in phase. Thus, the second element signal can be extracted.

Note that, in the present apparatus, the arrangement of the frequencies fa and fb of the first and second signals or the frequency fx of the local oscillation signal are similar to that in the above first embodiment. That is, if the frequency fx is set to be double the frequency of the first and second element signals (fx=2fa=2fb), the same effects as those according to the first embodiment can be achieved. Also, if frequency modulation (FM) is used, the same effects can be achieved. Furthermore, if ASK modulation is used, the baseband information (Da or Db) of the first or second element signal can be obtained with a simple structure, as described above.

As described in the foregoing, the multiplex transmission apparatus according to the fifth embodiment is so structured as to convert signal groups each including a plurality of element signals varied in phase into optical signals. After multiplexing these optical signals for transmission, the apparatus converts them again into electrical signals. In such structured apparatus, the optical signal is modulated again with the same local oscillation signals varied in phase by a predetermined amount. Therefore, only a single optical receiver is required, thereby reducing the cost of the apparatus and enabling selective extraction of only the desired element signal from the signal groups.

Note that, as described above, the number of element signals to each of the first and second multiplexer 12071 and 12072 may be 3 or more.

(Sixth Embodiment)

Figure 13:
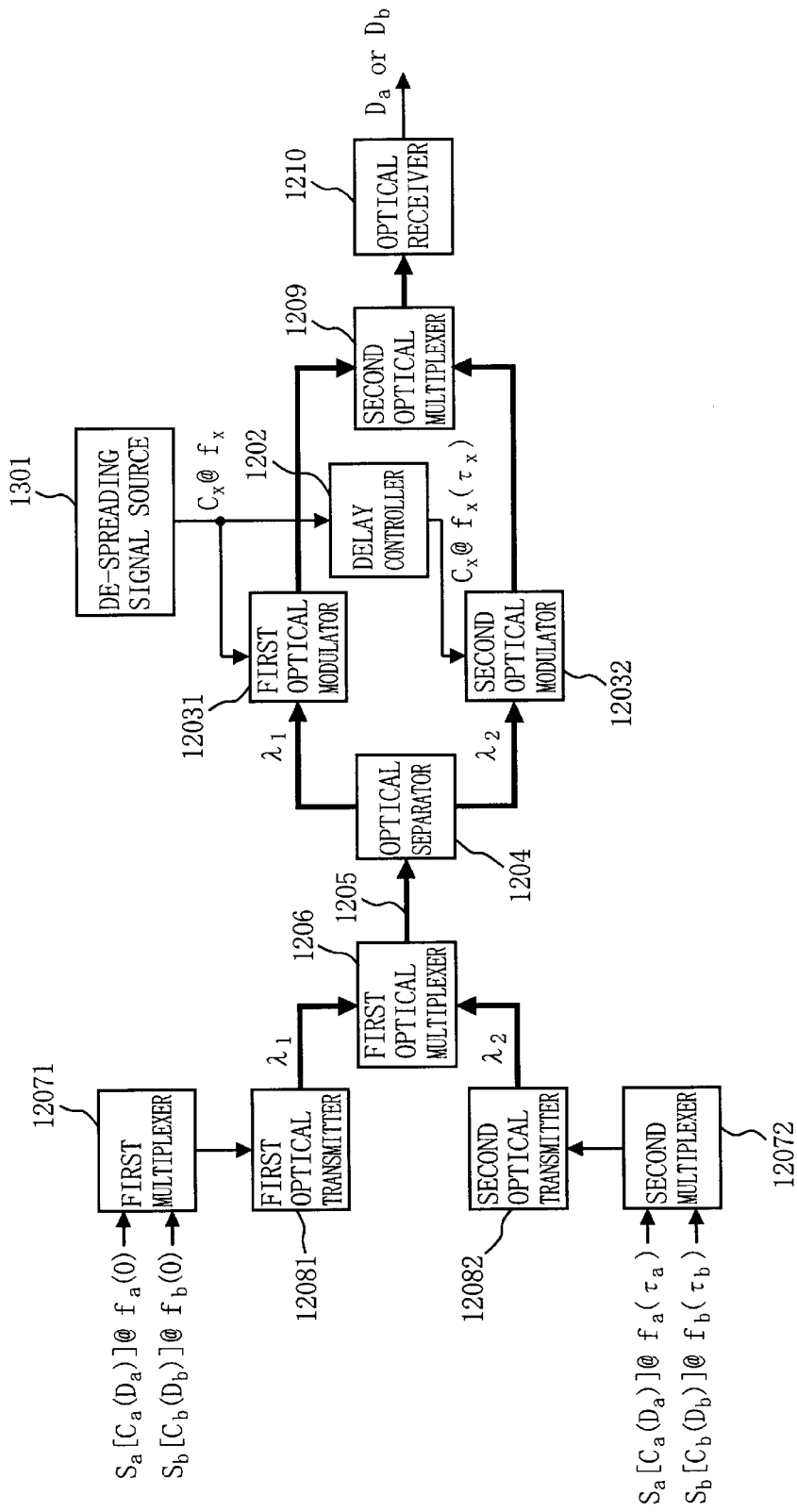
FIG. 13 is a block diagram showing the structure of a multiplex transmission apparatus according to a sixth embodiment of the present invention.

FIG. 13 shows the structure of a multiplex transmission apparatus according to a sixth embodiment of the present invention. In FIG. 13, the multiplex transmission apparatus includes the first and second multiplexers 12071 and 12072, the first and second optical transmitters 12081 and 12082, the first optical multiplexer 1206, the optical transmission path 1205, the optical separator 1204, a de-spreading signal source 1301, the delay controller 1202, the first and second optical modulators 12031 and 12032, the second optical multiplexer 1209, and the optical receiver 1210.

The present apparatus is different from that shown in FIG. 12 in that the de-spreading signal source 1301 is provided in place of the signal source 1201, and spectrum spread signals are used as the first and second element signals.

Next, the operation of the present apparatus shown in FIG. 13 is described. The present apparatus is similar to that according to the fifth embodiment shown in FIG. 12. Therefore, each component similar in operation to that according to the fifth embodiment are provided with the same reference numeral, and not described herein. Mainly described here is the difference in operation from the apparatus according to the fifth embodiment.

The present multiplex transmission apparatus uses spread spectrum signals as the first and second element signals. That is, assume herein that the first element signal is the signal Sa obtained by spectrum-spreading the baseband information Da with the spreading code Ca, while the second element signal is the signal Sb obtained by spectrum-spreading the baseband information Db with the spreading code Cb. Furthermore, the de-spreading signal source 1301 outputs a modulated signal with a predetermined de-spreading code Cx having a predetermined frequency fx.

Here, as with the multiplex transmission apparatus of FIG. 5, assume herein that the spreading codes Ca and Cb are equal. In such case, the predetermined de-spreading code Cx is set as a de-spreading code $Ca^{-1}$ of the spreading code Ca (=Cb). Also, in the delay controller 1202, the predetermined time delay τx is set to coincide with the phase difference τa between the first main and sub-element signals. With these settings, obtained from the optical receiver 1210 is the baseband information Da of the first element signal at the frequency |fx−fa|.

Similarly, the predetermined de-spreading code Cx is set as a de-spreading code $Cb^{-1}$ of the spreading code Cb (=Ca). Also, in the delay controller 1202, the predetermined time delay τx is set to coincide with the phase difference τb between the second main and sub-element signals. With these settings, obtained from the optical receiver 1210 is the baseband information Db of the second element signal at the frequency |fx−fb|.

If the spreading codes Ca and Cb are not equal, the predetermined time delay τx of the delay controller 1202 is so set as to coincide with τa or τb. Also, the predetermined de-spreading code Cx is set as the de-spreading code $Ca^{-1}$ or $Cb^{-1}$ of the spreading code Ca or Cb. With these settings, obtained from the optical receiver 110 is the baseband information Da of the first element signal at the frequency |fx−fa| or the baseband information Db of the second element signal at the frequency |fx−fb|.

Note that, as described above, extracting frequency-sum components (for example, fx+fa or fx+fb) can achieve the same operation and effects as those achieved by extracting the frequency difference components.

As described in the foregoing, the multiplex transmission apparatus according to the sixth embodiment is so structured as to convert spread spectrum signal groups each including spread spectrum signals as element signals varied in phase into optical signals. After multiplexing these optical signals for transmission, the apparatus converts them again into electrical signals. In such structured apparatus, the optical signals are modulated with the same modulating signals varied in phase by a predetermined amount based on the predetermined de-spreading code. Therefore, only a single optical receiver is required. Thus, the cost of the apparatus can be reduced, and only the desired spread spectrum signal after de-spreading can be obtained from the spread spectrum signal group, and the corresponding baseband information can be selectively obtained.

Note that, as described above in the first embodiment, the number of element signals to each of the first and second multiplexer 12071 and 12072 may be 3 or more.

(Seventh Embodiment)

Figure 14:
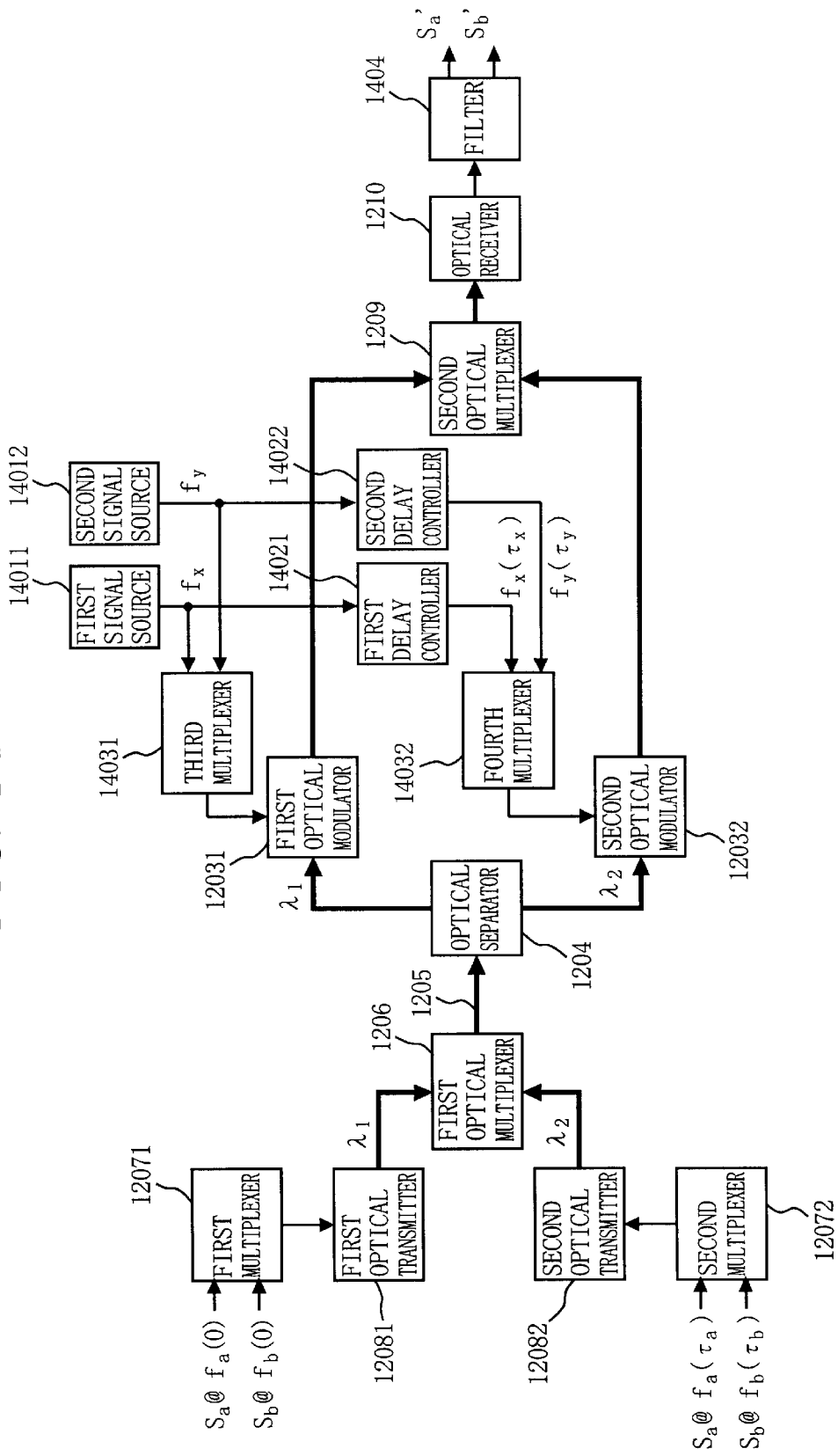
FIG. 14 is a block diagram showing the structure of a multiplex transmission apparatus according to a seventh embodiment of the present invention.

FIG. 14 shows the structure of a multiplex transmission apparatus according to a seventh embodiment of the present invention. In FIG. 14, the multiplex transmission apparatus includes the first and second multiplexers 12071 and 12072, the first and second optical transmitters 12081 and 12082, the first optical multiplexer 1206, the optical transmission path 1205, the optical separator 1204, first and second signal sources 14011 and 14012, first and second delay controllers 14021 and 14022, third and fourth multiplexers 14031 and 14032, the first and second optical modulators 12031 and 12032, the second optical multiplexer 1209, the optical receiver 1210, and a filter 1404.

The present apparatus is different from that shown in FIG. 12 in that a plurality of sets of the signal source and the delay controller (in FIG. 14, two sets) are provided, and the third and fourth multiplexers 14031 and 14032 and the filter 1404 are newly added.

Next, the operation of the present apparatus shown in FIG. 14 is described. The present apparatus is similar to that according to the fifth embodiment shown in FIG. 12. Therefore, each component similar in operation to that according to the fifth embodiment are provided with the same reference numeral, and not described herein. Mainly described here is the difference in operation from the apparatus according to the fifth embodiment.

In the present embodiment, the first signal source 14011 outputs the first local oscillation signal (main local oscillation signal) having the frequency fx. The first delay controller 14021 correspondingly provided gives the predetermined time delay τx to the first main local oscillation signal for output as the first sub-local oscillation signal.

Similarly, the second signal source 14012 outputs the second local oscillation signal (main local oscillation signal) having the frequency fy. The first delay controller 14022 correspondingly provided gives the predetermined time delay τy to the first main local oscillation signal for output as the second sub-local oscillation signal.

The third multiplexer 14031 multiplexes the first and second main local oscillation signals outputted from the first and second signal sources 14011 and 14012, and outputs the resultant signal to the first optical modulator 12031. The fourth multiplexer 14032 multiplexes the first and second sub-local oscillation signals outputted from the first and second delay controllers 14021 and 14022, and outputs the resultant signal to the second optical modulator 12032.

The first and second optical signals modulated again by the first and second optical modulators 12031 and 12032 are multiplexed together, and then supplied to the optical receiver 1210. The optical receiver 1210 converts the received optical signal again into electrical signals for output. Such electrical signals are a signal Sa' equivalent to the first element signal with its frequency converted and a signal Sb' equivalent to the second element signal with its frequency converted. The filter 1404 passes only the predetermined frequency components of the electrical signals outputted from the optical receiver 1210.

Next, the operation and effects of the present multiplex transmission apparatus are described in more detail. The first main element signal (frequency fa) and second main element signal (frequency fb) are converted in the first optical transmitter 12081 into the first optical signal. The first optical signal is modulated in the first optical modulator 12031 with the first main local oscillation signal (frequency fx). Then, square-law detection is carried out by the first optical receiver 1201, converting the optical signal into the electrical signals having the frequencies |fx-fa| and |fx-fb| for output. Similarly, the first and second sub-element signals converted into the second optical signal are, in the end, converted into the electrical signals having the frequencies |fx-fa| and |fx-fb|.

Here, the time delay τx is so adjusted at the first delay controller 14021 as that the first main and sub-element signals outputted from the optical receiver 1210 become in phase. Thus, the frequency-converted first element signal can be extracted. Similarly, the time delay τy is so adjusted at the second delay controller 14022 as that the second main and sub-element signals outputted from the optical receiver 1210 become in phase. Thus, the frequency-converted second element signal can be extracted.

In short, in the present multiplex transmission apparatus, two sets of the signal source and the delay controller are provided, and the time delays τy and τy are separately controlled. Thus, the first and second element signals can be extracted simultaneously. For example, the filter 1404 passes and outputs the first element signal having the frequency |fx-fa| and the second element signal having the frequency |fx-fb|.

Also, as already described in the multiplex transmission apparatus according to the third embodiment, the present apparatus may include first and second de-spreading signal sources in place of the first and second signal sources 14011 and 14012. Also, the present apparatus may use spread spectrum signals as the first and second element signals.

As described in the foregoing, the multiplex transmission apparatus according to the seventh embodiment is so structured as to convert signal groups each including element signals varied in phase into optical signals. After multiplexing these optical signals for transmission, the apparatus converts them again into electrical signals. In such structured apparatus, the optical signals are modulated again with local oscillation signal group including a plurality of local oscillation signals varied in phase by a predetermined amount. Therefore, only a single optical receiver is required. Thus, the cost of the apparatus can be reduced, and a plurality of desired element signals after frequency conversion can be simultaneously extracted from the signal groups.

Note that, as described above, the number of element signals to each of the first and second multiplexer 12071 and 12072 may be 3 or more. Also, the number of local oscillation signals N supplied to the third or fourth multiplexer 14031 or 14032 may be 3 or more. Furthermore, the number of multiplexers (antenna elements) P including the first and second multiplexers 12071 and 12072 may be 3 or more. Needless to say, any one or two or all of the above N, M, and P may be 3 or more. Still further, as described above, the signal sources may be de-spreading signal sources.

While the invention has been described in detail, the foregoing description is in all aspects illustrative and not restrictive. It is understood that numerous other modifications and variations can be devised without departing from the scope of the invention.

What is claimed is:

1. A multiplex transmission apparatus that converts a plurality of signals varied in phase into an optical signal and, after transmission, extracts a desired signal therefrom, comprising:

a signal source for outputting a main local oscillation signal having a predetermined frequency fx;

a first delay controller for giving a predetermined time delay τx to said main local oscillation signal outputted from said signal source and outputting said main local oscillation signal as a first sub-local oscillation signal;

a first optical transmitter for converting said main local oscillation signal outputted from said signal source into a first optical signal having a wavelength λ1;

second optical transmitter for converting said first sub-local oscillation signal outputted from said first delay controller into a second optical signal having a wavelength λ2;

a first optical multiplexer for multiplexing said first optical signal outputted from said first optical transmitter and said second optical signal outputted from said second optical transmitter;

a first optical transmission path for transmitting an optical signal outputted from said first optical multiplexer;

an optical separator for separating, for each wavelength, the optical signal transmitted through said first optical transmission path and outputting said first and second optical signals;

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to said first main element signal and a second sub-element signal obtained by giving a predetermined time delay τb to said second main element signal, and outputting a multiplexed signal as a first sub-signal group;

a first optical modulator for modulating said first optical signal outputted from said optical separator with said main signal group outputted from said first multiplexer;

a second optical modulator for modulating said second optical signal outputted from said optical separator with said first sub-signal group outputted from said second multiplexer;

a second optical multiplexer for multiplexing said first optical signal outputted from said first optical modulator and said second optical signal outputted from said second optical modulator;

a second optical transmission path for transmitting an optical signal outputted from said second optical multiplexer; and an optical receiver for carrying out square-law detection on the optical signal transmitted through said second optical transmission path, and outputting a signal that uniquely corresponds to either one of said first main and sub-element signals and said second main and sub-element signals.

2. The multiplex transmission apparatus according to claim 1, further comprising:

one or more second delay controllers for giving each different time delay to said main local oscillation signal outputted from said signal source, and outputting said main local oscillation signal as a second sub-local oscillation signal;

one or more third optical transmitters for converting said second sub-local oscillation signal outputted from said corresponding second delay controller into a third optical signal having each different wavelength;

one or more third multiplexers for multiplexing a third sub-element signal obtained by giving each different time delay to said first main element signal and a fourth sub-element signal obtained by giving each different time delay to said second main element signal, and outputting a multiplexed signal as a second sub-signal group; and one or more third optical modulators for modulating said third optical signal outputted from said optical separator with said second sub-signal group outputted from said corresponding third multiplexer, wherein said first optical multiplexer multiplexes said first optical signal outputted from said first optical transmitter, said second optical signal outputted from said second optical transmitter, and one or more said third optical signals outputted from said third optical transmitters, said optical separator separates, for each wavelength, the optical signal transmitted through said first optical transmission path, and outputting said first and second signals, and one or more said third optical signals, said second optical multiplexer multiplexes said first optical signal outputted from said first optical modulator, said second optical signal outputted from said second optical modulator, and one or more said third optical signals outputted from said third optical modulators, and said optical receiver carries out square-law detection on the optical signal transmitted through said second optical transmission path, and outputs a signal that uniquely corresponds to either one of said first main element signal (and said first and third sub-element signals), and said second main element signal (and said second and fourth sub-element signals).

3. The multiplex transmission apparatus according to claim 1, wherein in said first delay controller, said predetermined time delay τx is set to be equal to either one of the time delay τa of said first sub-element signal with respect to said first main element signal and the time delay τb of said second sub-element signal with respect to said second main element signal, and said optical receiver outputs either one of a signal having a frequency |fx−fa| obtained by converting said first main and sub-element signals and a signal having a frequency |fx−fb| obtained by converting said second main and sub-element signals.

4. The multiplex transmission apparatus according to claim 3, wherein the frequency fa of said first main and sub-element signals coincides with the frequency fb of said second main and sub-element signals.

5. The multiplex transmission apparatus according to claim 4, wherein in said signal source, said predetermined frequency fx is set to be double the frequency fa of said first main and sub-element signals (or the frequency fb of said second main and sub-element signals), and said optical receiver outputs either one of the signal having the frequency fa and corresponding to said first main and sub-element signals and the signal having the frequency fb and corresponding to said second main and sub-element signals.

6. The multiplex transmission apparatus according to claim 3, wherein said first and second main and sub-element signals are angle-modulated signals.

7. The multiplex transmission apparatus according to claim 3, wherein said first and second main and sub-element signals are ASK (Amplitude Shift Keying)-modulated signals, in said signal source, said predetermined frequency fx is set to be equal to either one of the frequency fa of said first main and sub-element signals and the frequency fb of said second main and sub-element signals), and said optical receiver demodulates either one of said first main and sub-element signals and said second main and sub-element signals, and outputs a corresponding baseband signal.

8. The multiplex transmission apparatus according to claim 1, wherein in said first delay controller, said predetermined time delay τx is set to be equal in amount and opposite in sign to either one of the time delay τa of the first sub-element signal with respect to said first main element signal and the time delay τb of the second sub-element signal with respect to said second main element signal, and said optical receiver outputs either one of a signal having a frequency fx+fa obtained by converting said first main and sub-element signals and a signal having a frequency fx+fb by converting said second main and sub-element signals.

9. The multiplex transmission apparatus according to claim 1, wherein
said signal source outputs a modulated signal having the frequency fx obtained by modulating a predetermined de-spreading code Cx as an original signal,
said first main and sub-element signals are modulated signals obtained by spectrum-spreading a baseband signal Da with a predetermined spreading code Ca, and,
said second main and sub-element signals are modulated signals obtained by spectrum-spreading a baseband signal Db with a predetermined spreading code Cb.

10. The multiplex transmission apparatus according to claim 9, wherein
in said signal source, the predetermined de-spreading code Cx is set to be as either one of a de-spreading code of the spreading code Ca for said first main and sub-element signals and a de-spreading code of the spreading code Cb for said second main and sub-element signals,
in said first delay controller, said predetermined time delay τx is set to be equal to either one of the time delay τa of the first sub-element signal with respect to said first main element signal and the time delay τb of the second sub-element signal with respect to said second main element signal, and
said optical receiver outputs either one of a signal having a frequency |fx−fa| obtained by spectrum-de-spreading said first main and sub-element signals and a signal having a frequency |fx−fb| obtained by spectrum-de-spreading said second main and sub-element signals.

11. The multiplex transmission apparatus according to claim 10, wherein
the frequency fa of said first main and sub-element signals coincides with the frequency fb of said second main and sub-element signals.

12. The multiplex transmission apparatus according to claim 11, wherein
in said signal source, said predetermined frequency fx is set to be double the frequency fa of said first main and sub-element signals (or the frequency fb of said second main and sub-element signals), and
said optical receiver outputs either one of a signal having the frequency fa obtained by spectrum-de-spreading said first main and sub-element signals and a signal having the frequency fb by spectrum-de-spreading said second main and sub-element signals.

13. The multiplex transmission apparatus according to claim 9, wherein
in said signal source, the predetermined de-spreading code Cx is set to be as either one of a de-spreading code of the spreading code Ca for said first main and sub-element signals and a de-spreading code of the spreading code Cb for said second main and sub-element signals,
in said first delay controller, said predetermined time delay τx is set to be equal in amount and opposite in sign to either one of the time delay τa of the first sub-element signal with respect to said first main element signal and the time delay τb of the second sub-element signal with respect to said second main element signal, and
said optical receiver outputs either one of a signal having a frequency fx+fa obtained by spectrum-de-spreading said first main and sub-element signals and a signal having a frequency fx+fb obtained by spectrum-de-spreading said second main and sub-element signals.

14. A multiplex transmission apparatus that converts a plurality of signals varied in phase into an optical signal and, after transmission, simultaneously extracts a plurality of desired signals therefrom, comprising:
a first signal source for outputting a first main local oscillation signal having a predetermined frequency fx;
a second signal source for outputting a second main local oscillation signal having a predetermined frequency fy;
a first delay controller for giving a predetermined time delay τx to said first main local oscillation signal outputted from said first signal source and outputting said first main local oscillation signal as a first sub-local oscillation signal;
a second delay controller for giving a predetermined time delay τy to said second main local oscillation signal outputted from said second signal source and outputting said second main local oscillation signal as a second sub-local oscillation signal;
a third multiplexer for multiplexing said first main local oscillation signal outputted from said first signal source and said second main local oscillation signal outputted from said second signal source, and outputting a multiplexed signal as a main local oscillation signal group;
a fourth multiplexer for multiplexing said first sub-local oscillation signal outputted from said first delay controller and said second sub-local oscillation signal outputted from said second delay controller, and outputting a multiplexed signal as a sub-local oscillation signal group;
a first optical transmitter for converting said main local oscillation signal group outputted from said third multiplexer into a first optical signal having a wavelength λ1;
a second optical transmitter for converting said first sub-local oscillation signal group outputted from said fourth multiplexer into a second optical signal having a wavelength λ2;
a first optical multiplexer for multiplexing said first optical signal outputted from said first optical transmitter and said second optical signal outputted from said second optical transmitter;
a first optical transmission path for transmitting an optical signal outputted from said first optical multiplexer;
an optical separator for separating, for each wavelength, the optical signal transmitted through said first optical transmission path and outputting said first and second optical signals;
a first multiplexer for multiplexing a first main element signal having a predetermined frequency fa and a second main element signal having a predetermined frequency fb, and outputting a multiplexed signal as a main signal group;
a second multiplexer for multiplexing a first sub-element signal obtained by giving a predetermined time delay τa to said first main element signal and a second sub-element signal obtained by giving a predetermined time delay τb to said second main element signal, and outputting a multiplexed signal as a first sub-signal group;
a first optical modulator for modulating said first optical signal outputted from said optical separator with said main signal group outputted from said first multiplexer;

a second optical modulator for modulating said second optical signal outputted from said optical separator with said first sub-signal group outputted from said second multiplexer;

a second optical multiplexer for multiplexing said first optical signal outputted from said first optical modulator and said second optical signal outputted from said second optical modulator;

a second optical transmission path for transmitting an optical signal outputted from said second optical multiplexer;

an optical receiver for carrying out square-law detection on the optical signal transmitted through said second optical transmission path, and outputting signals that uniquely correspond to said first main and sub-element signals and said second main and sub-element signals; and a filter for separating the signal outputted from said optical receiver by passing signal components uniquely corresponding to said first main and sub-element signals and signal components uniquely corresponding to said second main and sub-element signals for output.

15. The multiplex transmission apparatus according to claim 14, further comprising:

one or more third signal sources for outputting a third main local oscillation signal having a predetermined frequency; and one or more third delay controllers for giving each different time delay to said third main local oscillation signal outputted from said third signal source, and outputting said third main local oscillation signal as a third sub-local oscillation signal, wherein said third optical multiplexer multiplexes said first main local oscillation signal outputted from said first signal source, said second main local oscillation signal outputted from said second signal source, and one or more said third main local oscillation signals outputted from said third signal sources, and outputs a multiplexed signal as a main local oscillation group, said fourth optical multiplexer multiplexes said first sub-local oscillation signal outputted from said first delay controller, second sub-local oscillation signal outputted from said second delay controller, and one or more said third sub-local oscillation signals outputted from said third delay controllers, and outputs a multiplexed signal as a first sub-local oscillation signal group, said first multiplexer multiplexes the first main element signal having the predetermined frequency fa, the second main element signal having the predetermined frequency fb, and one or more third element signals having a predetermined frequency, and outputs a multiplexed signal as a main signal group, said second multiplexer multiplexes the first sub-element signal obtained by giving the predetermined time delay τa to said first main element signal, the second sub-element signal obtained by giving the predetermined time delay τb to said second main element signal, and one or more third sub-element signals obtained by giving each predetermined time delay to said third main element signals, and outputs a multiplexed signal as a first sub-signal group, said optical receiver carries out square-law detection on the optical signal transmitted through said second optical transmission path, and outputs signals that uniquely correspond to said first main and sub-element signals, said second main and sub-element signals, and one or more said third main and sub-element signals, and said filter separates the signal outputted from said optical receiver by passing signal components uniquely corresponding to said first main and sub-element signals, signal components uniquely corresponding to said second main and sub-element signals, and signal components uniquely corresponding to one or more said third main and sub-element signals for output.

16. The multiplex transmission apparatus according to claim 14, further comprising:

one or more third delay controllers for giving each different time delay to said first main local oscillation signal outputted from said first signal source, and outputting said first main local oscillation signal as a third sub-local oscillation signal;

one or more fourth delay controllers for giving each different time delay to said second main local oscillation signal outputted from said second signal source, and outputting said second main local oscillation signal as a fourth sub-local oscillation signal;

one or more fifth multiplexers for multiplexing said third sub-local oscillation signal outputted from said corresponding third delay controller and said fourth sub-local oscillation signal outputted from said corresponding fourth delay controller, and outputting a multiplexed signal as a second sub-local oscillation signal group;

one or more third optical transmitters for converting said second sub-local oscillation signal group outputted from said corresponding fifth multiplexer into a third optical signal having a different wavelength;

one or more sixth multiplexers for multiplexing a third sub-element signal obtained by giving a different time delay to said first main element signal and a fourth sub-element signal obtained by giving a different time delay to said second main element signal, and outputting a multiplexed signal as a second sub-signal group; and one or more third optical modulator for modulating said third optical signal outputted from said optical separator with said second sub-signal group outputted from said corresponding sixth multiplexer, wherein said first optical multiplexer multiplexes said first optical signal outputted from said first optical transmitter, said second optical signal outputted from said second optical transmitter, and one or more said third optical signals outputted from said third optical transmitters, said optical separator separates, for each wavelength, the optical signal transmitted through said first optical transmission path, and outputting said first and second signals, and one or more said third optical signals, said second optical multiplexer multiplexes said first optical signal outputted from said first optical modulator, said second optical signal outputted from said second optical modulator, and one or more said third optical signals outputted from said third optical modulators, said optical receiver carries out square-law detection on the optical signal transmitted through said second optical transmission path, and outputs signals that uniquely correspond to said first main element signal (and said first and third sub-element signals) and said second main element signal (and said second and fourth sub-element signals), and said filter separates the signal outputted from said optical receiver by passing signal components uniquely corresponding to said first main element signal (and said first and third sub-element signals), and signal components uniquely corresponding to said second main element signals (and said second and fourth sub-element signals).

17. The multiplex transmission apparatus according to claim 14, wherein in said first delay controller, said predetermined time delay τx is set to be equal to the time delay τa of said first sub-element signal with respect to said first main element signal, in said second delay controller, said predetermined time delay τy is set to be equal to the time delay τb of said second sub-element signal with respect to said second main element signal, and said optical receiver outputs a signal having a frequency |fx−fa| obtained by converting said first main and sub-element signals and a signal having a frequency |fx−fb| obtained by converting said second main and sub-element signals.

18. The multiplex transmission apparatus according to claim 17, wherein the frequency fa of said first main and sub-element signals coincides with the frequency fb of said second main and sub-element signals.

19. The multiplex transmission apparatus according to claim 17, wherein said first and second main and sub-element signals are angle-modulated signals.

20. The multiplex transmission apparatus according to claim 14, wherein in said first delay controller, said predetermined time delay τx is set to be equal in amount and opposite in sign to the time delay τa of the first sub-element signal with respect to said first main element signal, in said second delay controller, said predetermined time delay τy is set to be equal in amount and opposite in sign to the time delay τb of the second sub-element signal with respect to said second main element signal, and said optical receiver outputs a signal having a frequency fx+fa obtained by converting said first main and sub-element signals and a signal having a frequency fx+fb by converting said second main and sub-element signals.

21. The multiplex transmission system according to claim 14, wherein said first signal source outputs a modulated signal having the frequency fx obtained by modulating a predetermined de-spreading code Cx as an original signal, said second signal source outputs a modulated signal having the frequency fy obtained by modulating a predetermined de-spreading code Cy as an original signal, said first main and sub-element signals are modulated signals obtained by spectrum-spreading a baseband signal Da with a predetermined spreading code Ca, and said second main and sub-element signals are modulated signals obtained by spectrum-spreading a baseband signal Db with a predetermined spreading code Cb.

22. The multiplex transmission apparatus according to claim 21, wherein in said first signal source, the predetermined de-spreading code Cx is set to be a de-spreading code of the spreading code Ca for said first main and sub-element signals, in said second signal source, the predetermined de-spreading code Cy is set to be a de-spreading code of the spreading code Cb for said second main and sub-element signals, in said first delay controller, said predetermined time delay τx is set to be equal to the time delay τa of the first sub-element signal with respect to said first main element signal, in said second delay controller, said predetermined time delay τy is set to be equal to the time delay τb of the second sub-element signal with respect to said second main element signal, and said optical receiver outputs a signal having a frequency |fx−fa| obtained by spectrum-de-spreading said first main and sub-element signals and a signal having a frequency |fx−fb| obtained by spectrum-de-spreading said second main and sub-element signals.

23. The multiplex transmission apparatus according to claim 22, wherein the frequency fa of said first main and sub-element signals coincides with the frequency fb of said second main and sub-element signals.

24. The multiplex transmission apparatus according to claim 22, wherein said spreading code Ca coincides with said spreading code Cb.

25. The multiplex transmission apparatus according to claim 21, wherein in said first signal source, the predetermined de-spreading code Cx is set to be the de-spreading code of the spreading code Ca for said first main and sub-element signals, in said second signal source, the predetermined de-spreading code Cy is set to be the de-spreading code of the spreading code Cb for said second main and sub-element signals, in said first delay controller, said predetermined time delay τx is set to be equal in amount and opposite in sign to the time delay τa of the first sub-element signal with respect to said first main element signal, in said second delay controller, said predetermined time delay τy is set to be equal in amount and opposite in sign to the time delay τb of the second sub-element signal with respect to said second main element signal, and said optical receiver outputs a signal having a frequency fx+fa obtained by spectrum-de-spreading said first main and sub-element signals and a signal having a frequency fx+fb obtained by spectrum-de-spreading said second main and sub-element signals.

26. A multiplex transmission apparatus that converts a plurality of signals varied in phase into an optical signal and, after transmission, extracts a desired signal therefrom, comprising:

signal source for outputting a main local oscillation signal having a predetermined frequency fx;

a first delay controller for giving a predetermined time delay τx to said main local oscillation signal outputted from said signal source and outputting said main local oscillation signal as a first sub-local oscillation signal;

a first optical transmitter for converting said main local oscillation signal outputted from said signal source into a first optical signal having a wavelength λ1;

a second optical transmitter for converting said first sub-local oscillation signal outputted from said first delay controller into a second optical signal having a wavelength λ2;

a first optical multiplexer for multiplexing said first optical signal outputted from said first optical transmitter and said second optical signal outputted from said second optical transmitter;

a first optical multiplexer/demultiplexer, capable of passing an optical signal received at a first terminal thereof for output from a second terminal thereof, passing an optical signal received at said second terminal thereof for output from a third terminal thereof, for passing an optical signal outputted from said first optical multiplexer coupled to said first terminal for output from said second terminal thereof;

an optical transmission path coupled to said second terminal of said first optical multiplexer/demultiplexer for bi-directionally transmitting optical signals;

a second optical multiplexer/demultiplexer, capable of separating an optical signal received at a fourth terminal thereof for each wavelength for output from fifth and sixth terminals thereof and multiplexing optical signals received at said fifth and sixth terminals for output from said fourth terminal, for receiving the optical signal outputted from said second terminal of said first optical multiplexer/demultiplexer at said fourth terminal through said optical transmission path coupled thereto, separating the optical signal for each wavelength, and outputting said first optical signal from the fifth terminal and said second optical signal from the sixth terminal;

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to said first main element signal and a second sub-element signal obtained by giving a predetermined time delay τb to said second main element signal, and outputting a multiplexed signal as a first sub-signal group;

a first optical modulator for modulating said first optical signal outputted from said fifth terminal of said second optical multiplexer/demultiplexer with said main signal group outputted from said first multiplexer, and reflecting a modulated signal for output to said fifth terminal of said second optical multiplexer/demultiplexer;

a second optical modulator for modulating said second optical signal outputted from said sixth terminal of said second optical multiplexer/demultiplexer with said first sub-signal group outputted from said second multiplexer, and reflecting a modulated signal for output to said sixth terminal of said second optical multiplexer/demultiplexer; and an optical receiver for carrying out square-law detection on the optical signal outputted from said third terminal of said optical multiplexer/demultiplexer, and outputting a signal that uniquely corresponds to either one of said first main and sub-element signals and said second main and sub-element signals.

27. A multiplex transmission apparatus that converts a plurality of signals varied in phase into an optical signal and, after transmission, extracts a desired signal therefrom, comprising:

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to said first main element signal and a second sub-element signal obtained by giving a predetermined time delay τb to said second main element signal, and outputting a multiplexed signal as a first sub-signal group;

a first optical transmitter for converting said main signal group outputted from said first multiplexer into a first optical signal having a wavelength λ1;

a second optical transmitter for converting said sub-signal group outputted from said second multiplexer into a second optical signal having a wavelength λ2;

a first optical multiplexer for multiplexing said first optical signal outputted from said first optical transmitter and said second optical signal outputted from said second optical transmitter;

an optical transmission path for transmitting an optical signal outputted from said first optical multiplexer;

an optical separator for separating the optical signal transmitted through said optical transmission path for each wavelength, and outputting said first and second optical signals;

a signal source for outputting a main local oscillation signal having a predetermined frequency fx;

a first delay controller for giving a predetermined time delay τx to said main local oscillation signal outputted from said signal source and outputting said main local oscillation signal as a first sub-local oscillation signal;

a first optical modulator for modulating said first optical signal outputted from said optical separator with said main local oscillation signal outputted from said signal source;

a second optical modulator for modulating said second optical signal outputted from said optical separator with said first sub-local oscillation signal outputted from said first delay controller;

a second optical multiplexer for multiplexing said first optical signal outputted from said first optical modulator and said second optical signal outputted from said second optical modulator; and an optical receiver for carrying out square-law detection on an optical signal outputted from said second optical multiplexer, and outputting a signal that uniquely corresponds to either one of said first main and sub-element signals and said second main and sub-element signals.

28. The multiplex transmission apparatus according to claim 27, further comprising:

one or more third multiplexers for multiplexing a third sub-element signal obtained by giving each different time delay to said first main element signal and a fourth sub-element signal obtained by giving each different time delay to said second main element signal, and outputting a multiplexed signal as a second sub-signal group;

one or more third optical transmitters for converting said second sub-local oscillation signal outputted from said corresponding third multiplexer into a third optical signal group having each different wavelength;

one or more second delay controllers for giving each different time delay to said main local oscillation signal outputted from said signal source, and outputting said main local oscillation signal as a second sub-local oscillation signal; and one or more third optical modulators for modulating said third optical signal outputted from said optical separator with said second sub-local oscillation group outputted from said corresponding second delay controller, wherein said first optical multiplexer multiplexes said first optical signal outputted from said first optical transmitter, said second optical signal outputted from said second optical transmitter, and one or more said third optical signals outputted from said third optical transmitters, said optical separator separates, for each wavelength, the optical signal transmitted through said optical transmission path, and outputting said first and second signals, and one or more said third optical signals, said second optical multiplexer multiplexes said first optical signal outputted from said first optical modulator, said second optical signal outputted from said second optical modulator, and one or more said third optical signals outputted from said third optical modulators, and said optical receiver carries out square-law detection on the optical signal outputted from said second optical multiplexer, and outputs a signal that uniquely corresponds to either one of said first main element signal (and said first and third sub-element signals), and said second main element signal (and said second and fourth sub-element signals).

29. The multiplex transmission apparatus according to claim 27, wherein said signal source outputs a modulated signal having the frequency fx obtained by modulating a predetermined de-spreading code Cx as an original signal, said first main and sub-element signals are modulated signals obtained by spectrum-spreading a baseband signal Da with a predetermined spreading code Ca, and said second main and sub-element signals are modulated signals obtained by spectrum-spreading a baseband signal Db with a predetermined spreading code Cb.

30. A multiplex transmission apparatus that converts a plurality of signals varied in phase into an optical signal and, after transmission, extracts a desired signal therefrom, comprising:

a first multiplexer for multiplexing a first main element signal having a predetermined frequency fa and a second main element signal having a predetermined frequency fb, and outputting a multiplexed signal as a main signal group;

a second multiplexer for multiplexing a first sub-element signal obtained by giving a predetermined time delay τa to said first main element signal and a second sub-element signal obtained by giving a predetermined time delay τb to said second main element signal, and outputting a multiplexed signal as a first sub-signal group;

a first optical transmitter for converting said main signal group outputted from said first multiplexer into a first optical signal having a wavelength λ1;

a second optical transmitter for converting said first sub-signal group outputted from said second multiplexer into a second optical signal having a wavelength λ2;

a first optical multiplexer for multiplexing said first optical signal outputted from said first optical transmitter and said second optical signal outputted from said second optical transmitter;

an optical transmission path for transmitting an optical signal outputted from said first optical multiplexer;

an optical separator for separating the optical signal transmitted through said optical transmission path for each wavelength, and outputting said first and second optical signals;

a first signal source for outputting a first main local oscillation signal having a predetermined frequency fx;

a second signal source for outputting a second main local oscillation signal having a predetermined frequency fy;

a first delay controller for giving a predetermined time delay τx to said first main local oscillation signal outputted from said first signal source and outputting said first main local oscillation signal as a first sub-local oscillation signal;

a second delay controller for giving a predetermined time delay τy to said second main local oscillation signal outputted from said second signal source and outputting said second main local oscillation signal as a second sub-local oscillation signal;

a third multiplexer for multiplexing said first main local oscillation signal outputted from said first signal source and said second main local oscillation signal outputted from said second signal source, and outputting a multiplexed signal as a main local oscillation signal group;

a fourth multiplexer for multiplexing said first sub-local oscillation signal outputted from said first delay controller and said second sub-local oscillation signal outputted from said second delay controller, and outputting a multiplexed signal as a first sub-local oscillation signal group;

a first optical modulator for modulating said first optical signal outputted from said optical separator with said main local oscillation signal group outputted from said third multiplexer;

a second optical modulator for modulating said second optical signal outputted from said optical separator with said first sub-local oscillation signal group outputted from said fourth multiplexer;

a second optical multiplexer for multiplexing said first optical signal outputted from said first optical modulator and said second optical signal outputted from said second optical modulator;

an optical receiver for carrying out square-law detection on an optical signal outputted from said second optical multiplexer, and outputting a signal that uniquely corresponds to said first main and sub-element signals and said second main and sub-element signals; and a filter for separating the signal outputted from said optical receiver by passing signal components uniquely corresponding to said first main and sub-element signals and signal components uniquely corresponding to said second main and sub-element signals for output.

31. The multiplex transmission apparatus according to claim 30, further comprising:

one or more third signal generators for outputting a third main local oscillation signal having a predetermined frequency; and one or more third delay controllers for giving each different time delay to said third main local oscillation signal outputted from said corresponding third signal source, and outputting said third main local oscillation signal as a third sub-local oscillation signal, wherein said first multiplexer multiplexes a first main element signal having a predetermined frequency fa, a second main element signal having a predetermined frequency fb, and one or more third main element signals having the predetermined frequency, and outputting a multiplexed signal as a main signal group, said second multiplexer multiplexes a first sub-element signal obtained by giving a predetermined time delay τa to said first main element signal, a second sub-element signal obtained by giving a predetermined time delay τb to said second main element signal, and one or more third sub-element signals obtained by giving each predetermined time delay to said corresponding third main element signals, and outputting a multiplexed signal as a first sub-signal group, said third multiplexer multiplexes said first main local oscillation signal outputted from said first signal source, said second main local oscillation signal outputted from said second signal source, and said third main local oscillation signals outputted from one or more said third signal sources, and outputting a multiplexed signal as a main local oscillation signal group, said fourth multiplexer multiplexes said first sub-local oscillation signal outputted from said first delay controller, said second sub-local oscillation signal outputted from said second delay controller, and one or more said third sub-local oscillation signals outputted from one or more said third delay controllers, and outputting a multiplexed signal as a first sub-local oscillation signal group, said optical receiver carries out square-law detection on the optical signal outputted from said second optical multiplexer, and outputs a signal that uniquely corresponds to said first main and sub-element signals, said second main and sub-element signals, and one or more said third main and sub-element signals, and said filter for separating the signal outputted from said optical receiver by passing signal components uniquely corresponding to said first main and sub-element signals, signal components uniquely corresponding to said second main and sub-element signals, and signal components uniquely corresponding to one or more said third main and sub-element signals for output.

32. The multiplex transmission apparatus according to claim 30, further comprising:

one or more sixth multiplexers for multiplexing a third sub-element signal obtained by giving a different time delay to said first main element signal and a fourth sub-element signal obtained by giving a different time delay to said second main element signal, and outputting a multiplexed signal as a second sub-signal group;

one or more third optical transmitters for converting said second sub-signal group outputted from said corresponding sixth multiplexer into a third optical signal having a different wavelength;

one or more third delay controllers for giving each different time delay to said first main local oscillation signal outputted from said first signal source, and outputting said first main local oscillation signal as a third sub-local oscillation signal;

one or more fourth delay controllers for giving each different time delay to said second main local oscillation signal outputted from said second signal source, and outputting said second main local oscillation signal as a fourth sub-local oscillation signal;

one or more fifth multiplexers for multiplexing said third sub-local oscillation signal outputted from said corresponding third delay controller and said fourth sub-local oscillation signal outputted from said corresponding fourth delay controller, and outputting a multiplexed signal as a second sub-local oscillation signal group; and one or more third optical modulator for modulating said third optical signal outputted from said optical separator with said second sub-signal group outputted from said corresponding fifth multiplexer, wherein said first optical multiplexer multiplexes said first optical signal outputted from said first optical transmitter, said second optical signal outputted from said second optical transmitter, and one or more said third optical signals outputted from said third optical transmitters, said optical separator separates, for each wavelength, the optical signal transmitted through said first optical transmission path, and outputting said first and second signals, and one or more said third optical signals, said second optical multiplexer multiplexes said first optical signal outputted from said first optical modulator, said second optical signal outputted from said second optical modulator, and one or more said third optical signals outputted from said third optical modulators, said optical receiver carries out square-law detection on the optical signal transmitted through said second optical multiplexer, and outputs a signal that uniquely correspond to said first main element signal (and said first and third sub-element signals) and said second main element signal (and said second and fourth sub-element signals), and said filter separates the signal outputted from said optical receiver by passing signal components uniquely corresponding to said first main element signal (and said first and third sub-element signals), and signal components uniquely corresponding to said second main element signals (and said second and fourth sub-element signals).

33. A multiplex transmission method for converting a plurality of signals varied in phase into an optical signal, after transmission, extracting a desired signal therefrom, comprising the steps of:

converting a plurality of main element signals and a plurality of sub-element signals given each varied phase difference with respect to said corresponding main element signals into a plurality of optical signals varied in wavelength;

modulating, in advance or again, said each of said optical signals with a main local oscillation signal and a sub-local oscillation signal generated by giving, to said main local oscillation signal, a phase difference equal to the phase difference given to said corresponding sub-element signal; and carrying out square detection on said optical signal, converting said optical signal, and extracting a desired main and sub-element signals.

* * * * *